United States Patent [19]

Domanico et al.

[11] Patent Number: 5,032,821
[45] Date of Patent: Jul. 16, 1991

[54] MOTOR VEHICLE STABILITY MONITORING AND ALARM SYSTEM AND METHOD

[76] Inventors: Edward J. Domanico, 5350 Misty Dr., Mulberry, Fla. 33860; John D. Knight, 6 Stonebrooke Rd., Scarborough, Me. 04074

[21] Appl. No.: 351,110

[22] Filed: May 12, 1989

[51] Int. Cl.$^5$ .................. B60Q 1/00; G06F 15/20
[52] U.S. Cl. ..................... 340/440; 340/438; 340/461; 340/670; 340/671; 340/665; 340/666; 364/463; 364/424.03; 303/100; 303/107; 303/108; 303/109; 180/197; 180/290; 280/432; 73/862.04
[58] Field of Search ............... 340/440, 441, 438, 439, 340/461, 462, 669-671, 665, 666, 681, 685; 280/DIG. 1, 6 R, 6.1, 432; 180/118, 197, 271, 290, 76; 200/DIG. 32, 35, 85 R; 301/5 R, 5 B, 5 BA; 303/91, 94, 100, 102, 107-109; 364/426.02, 426.03, 426.04, 431.07, 424.03, 463, 569; 73/65, 66, 862.04

[56] References Cited

U.S. PATENT DOCUMENTS

| | | | |
|---|---|---|---|
| 3,636,364 | 1/1972 | Stempler et al. | 340/681 |
| 3,854,556 | 12/1974 | Gee | 340/671 |
| 4,070,562 | 1/1978 | Kuno et al. | 340/669 |
| 4,218,672 | 8/1980 | Weisshappel et al. | 180/290 |
| 4,285,240 | 8/1981 | Gold | 364/463 |
| 4,583,173 | 4/1986 | Odlen et al. | 364/426.03 |
| 4,647,928 | 3/1987 | Casey et al. | 364/463 |
| 4,803,459 | 2/1989 | Ta | 340/636 |

FOREIGN PATENT DOCUMENTS 3324437 1/1985 Fed. Rep. of Germany .

OTHER PUBLICATIONS

Brochure, "Truck System, Inc., Manufacturers, Steadi Eddie, Stability Monitoring and Alarm Systems", 5-1989.
"Steady Eddie", Stability Monitoring and Alarm System, Installation Manual, Truck System, 5-1989.
"Stabe-Alert Stability Monitoring and Alarm System", Roadway Safety System Inc., 5-1989.

Primary Examiner—Donnie L. Crosland
Attorney, Agent, or Firm—Nixon & Vanderhye

[57] ABSTRACT

A stability monitoring and alarm system for a motor vehicle (e.g., a truck or a tractor trailer) provides an early warning to the driver of unsafe or potentially unsafe conditions. Front wheel desynchronization and rear load distribution are each monitored, and an alarm is generated if either the front wheels become desynchronized or the load is unevenly distributed in the rear of the vehicle. Various filtering and averaging techniques avoid false alarms and increase reliability and sensitivity. Thresholding of the front wheel desynchronization comparison is based on a model which takes turning lateral G force for particular speeds into account so that an alarm based on front wheel descynchronization is not generated because of taking turns too rapidly. Rather, such alarm is generated by monitoring shifting rear load distribution —a better and more accurate measure of vehicle stability. The resulting indications provided by an easy to read user interface warn the driver of a variety of conditions (e.g., loss of traction due to hydroplaning or ice, shifting rear load, equipment failure, etc.) to help avoid accidents.

37 Claims, 17 Drawing Sheets

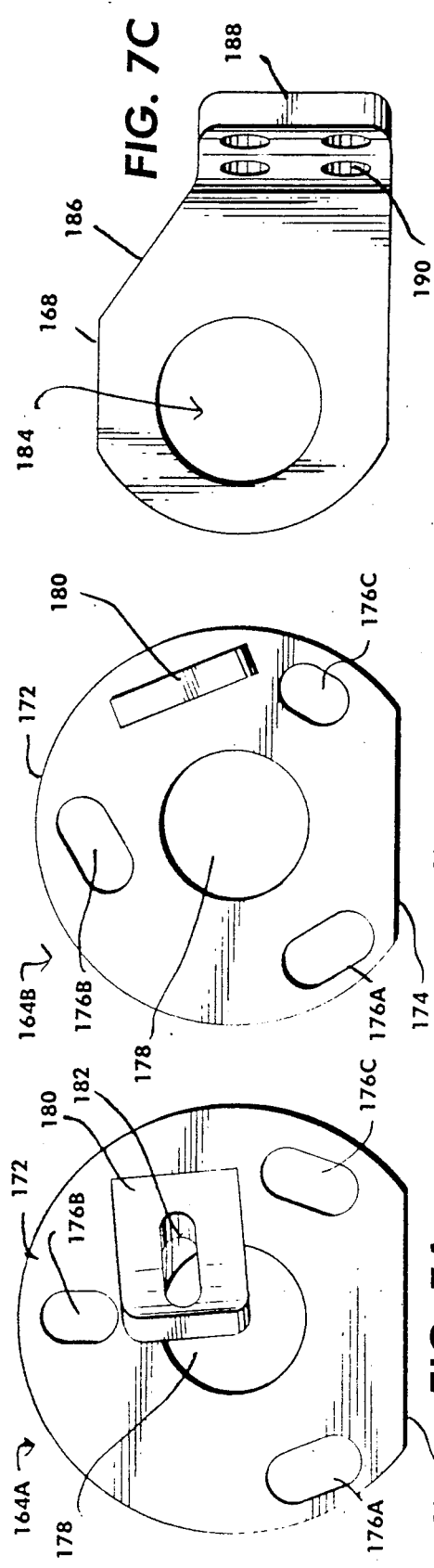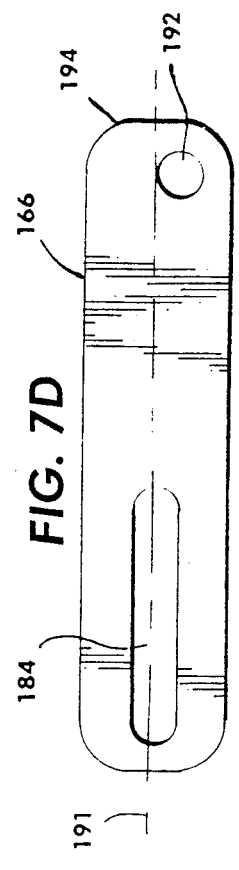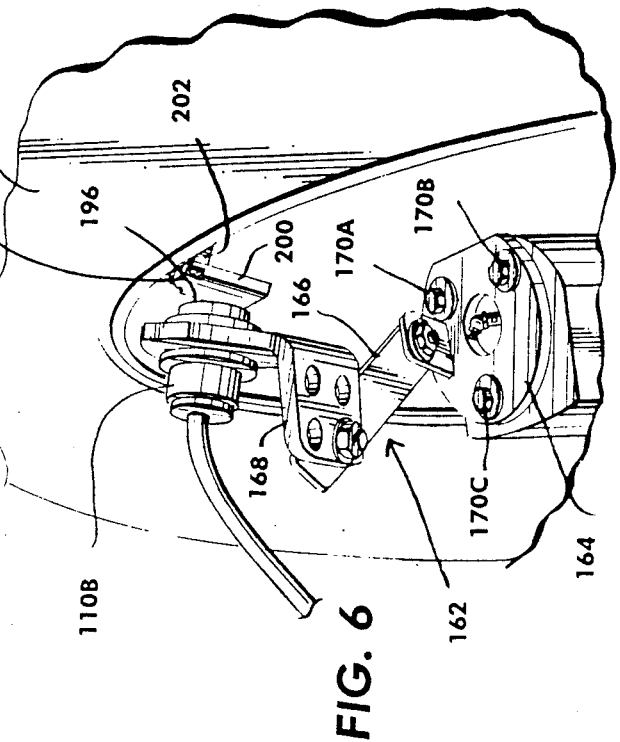

FIG. 11A
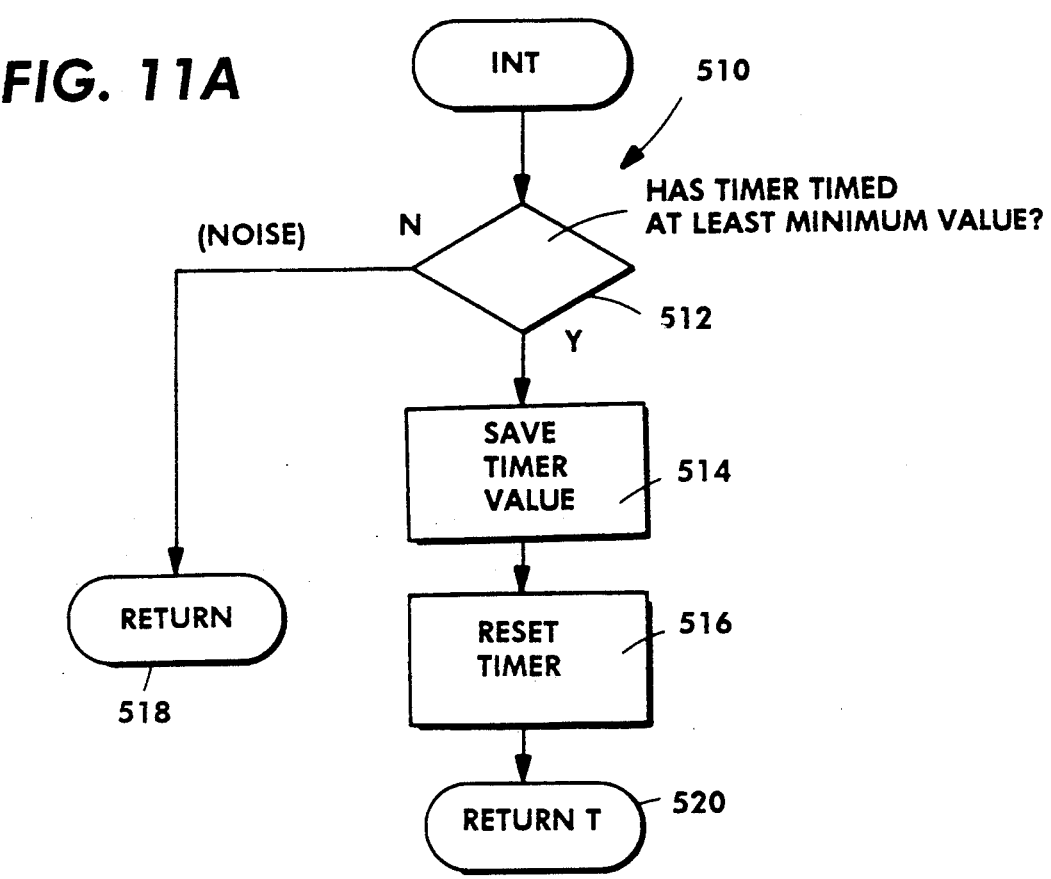
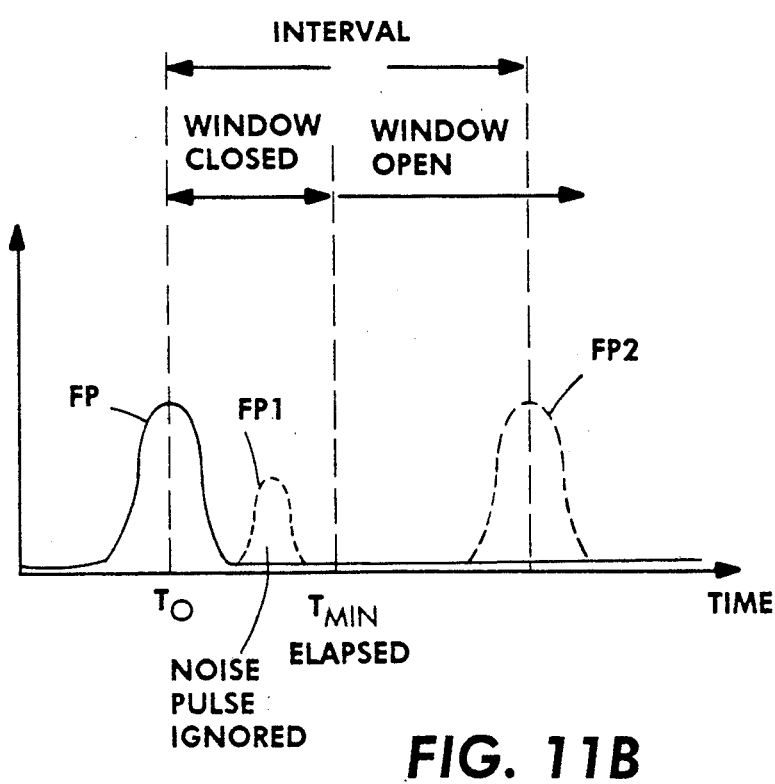
FIG. 11B

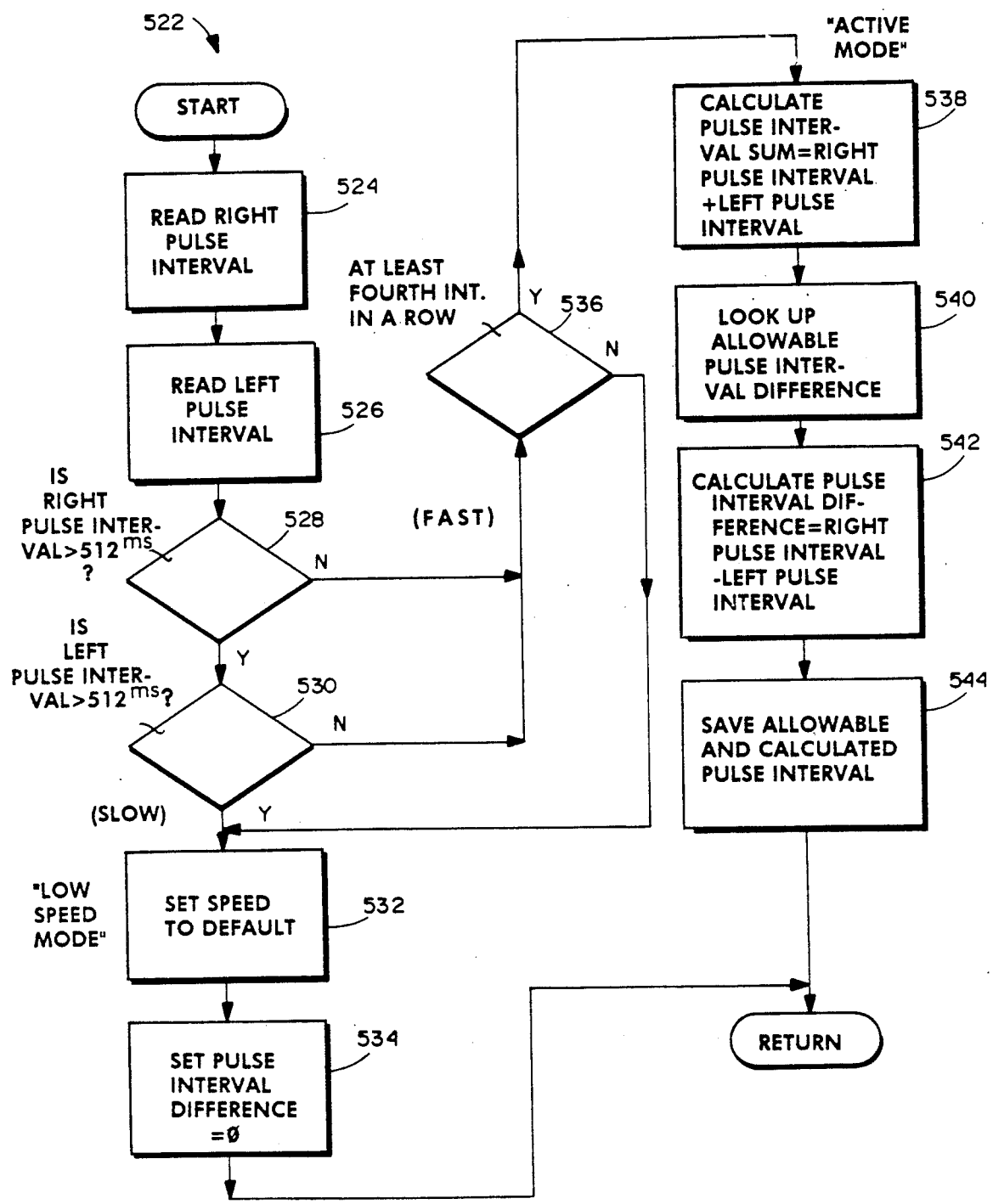

FIG. 13 LOAD DISTRIBUTION
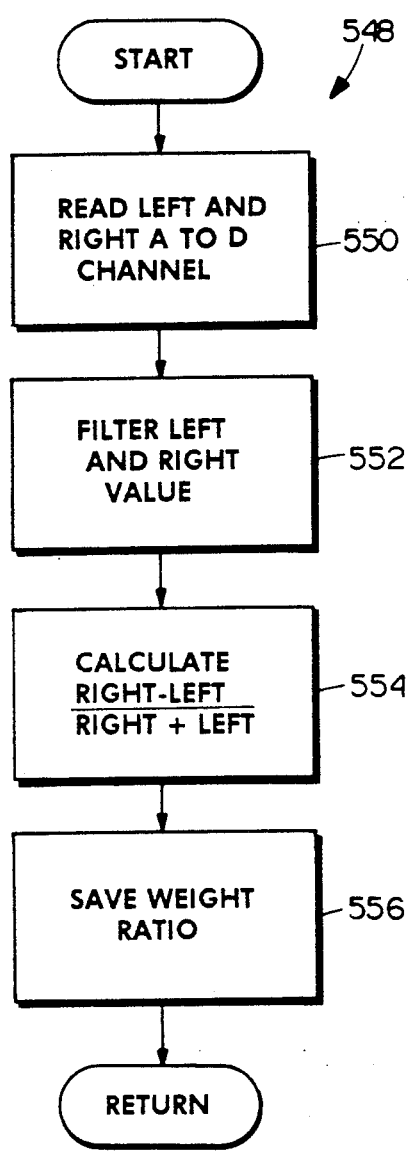
FIG. 14 FILTER ROUTINE
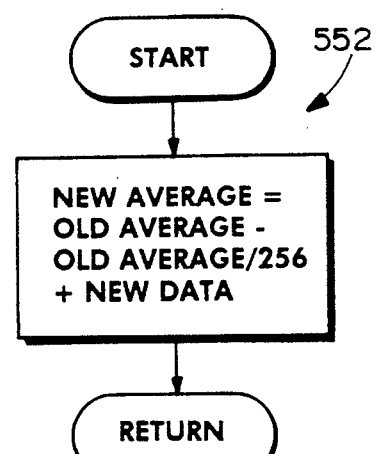

MOTOR VEHICLE STABILITY MONITORING AND ALARM SYSTEM AND METHOD

FIELD OF THE INVENTION

This invention relates to electronic safety systems for motor vehicles. More particularly, the invention pertains to systems and methods for monitoring and analyzing parameters of the operation of a motor vehicle in real time and for providing an indication of potentially or actually unsafe operating conditions. Still more particularly, the present invention relates to an electronic real time system and method for reliably and effectively monitoring the stability of a moving tractor-trailer (or other large motor vehicle) and for providing a useful audiovisual warning when dynamic stability problems occur.

BACKGROUND AND SUMMARY OF THE INVENTION

Each year, more than four billion tons of hazardous products and waste are transported throughout the United States. The safe handling and carriage of these materials (which include explosives, flammables, corrosive or toxic chemicals, poisons, spent reactor fuel and low-level waste, and disease-causing biological agents) are of major concern to federal, state and local agencies.

These hazardous materials move by land, sea and air modes of transportation at a rate of about 500 shipments per day. The types of vehicles carrying hazardous materials on the nation's highways range from tank trunks, bulk cargo carriers and other specially designated mobile containers, conventional tractor-trailers and flatbeds which carry packages, cylinders, drums and other small containers.

Trucks carry more hazardous materials than any other mode of transportation. Trucks travel on public rights-of-way through every jurisdiction, mingling with other traffic and thus increasing spill and accident risks.

Movements of gasoline and petroleum products (by far the most frequently transported hazardous materials) account for more hazardous materials transportation accidents, injuries and damage than transport of any other classified commodity. It is the risk of death or injury that causes the deepest concern. Hazardous material accidents are often spectacular, causing environmental contamination, injury and loss of life. No state or local official can erase the memory of an overturned load of explosives or tank of chemicals in an area for which he/she is responsible.

These experiences and the almost daily news reports of a hazardous material spill somewhere in the world have fueled the demand for strong enforcement of mandatory safety measures, improved emergency response and improved pre-accident safety technology onboard the vehicle to new heights of industry awareness. The insurance industry, the U.S. Department of Transportation, and state and local regulatory agencies have begun mandating safety in all facets of the trucking industry. The liability insurance for carriers, for example, has increased dramatically recently (over 500% within a year in some cases) and the rates are expected to continue to increase with no end in sight. In addition, the EPA (Environmental Protection Agency) has gained increased muscle from Congress and now has the ability to levy stiff fines after a major or minor spill has occurred. EPA action may result in fines of tens of thousands of dollars being levied on the individual carriers for cleanup operations.

There is no doubt that driver error and impaired operating ability is the single largest cause of truck accidents today. Driver training and awareness have therefore been targeted as the primary issue to all parties concerned. Safety and maintenance programs in the trucking fleets have been and will continue to be under close scrutiny by the insurance companies providing coverage. The slightest infraction or inappropriately filled-out supporting documentation may often result in immediate cancellation by the insurer. The serious carriers have complied and have diverted more money and time to proper driver training and safety maintenance programs for existing equipment. Such maintenance programs extend to brake systems, tires, steerings, lighting and overfill prevention systems.

In view of the increased costs to society of accidents in the trucking industry and the great public concern that presently exists over truck safety, it is obvious that any steps that could be taken to increase truck safety would be highly valuable. Truck manufacturers have taken steps to increase the safety of their products. For example, new "anti-skid" type braking systems have been designed and are now being installed in new trucks in order to minimize jackknifing and other dangerous results of careless or unskilled driver braking techniques. Other safety equipment (e.g., automatic fail-safe manhole covers for tank trucks, impact and explosive resistant tank shells and associated equipment, etc.) are now or soon will be mandated by federal rule. Insurers and governmental agencies are now mandating better driver training and education so as to increase the skill and competency of the nation's truck drivers and thus reduce the number of accidents on the road.

We all realize, however, that even the most careful and skilled drivers operating properly maintained and equipped trucks may still have accidents. One common cause of accidents is loss of traction on icy or wet road surfaces before the driver realizes a problem exists. Hydroplaning can occur without warning, causing even brand new tires to lose traction. Loss of front wheel traction due to hydroplaning or ice at the time the driver attempts to steer the truck around the curve can result in a catastrophic accident. Unfortunately, in many cases, the drive is not even aware that he has lost traction until he begins to lose control of the truck.

Load shifting and other rear instability problems are another very serious hazardous condition which can occur without warning and may very adversely affect the driver's control over his truck. Good drivers take great care to secure their loads to prevent them from shifting during transit. Unfortunately, knots can come untied, ropes or chains can break and anchor points can become loosened. Careful checking of the load at rest and fuel stops reduces but does not eliminate the problem. Overloaded or improperly loaded vehicles are subject to turning over if driven at excessive speeds around curves.

Needless to say, an automatic system capable of alerting the driver in advance that a hazardous or potentially hazardous condition (e.g., loss of front wheel traction and/or serious load imbalance) has occurred would increase safety. Such useful and timely warnings would be extremely valuable in helping to avoid accidents—and would be useful not only for inexperienced or inattentive drivers but also for the most experienced and careful of drivers.

In accordance with one aspect of the present invention, front wheel rotation and rear truck frame loading are both monitored. Specifically, in the preferred embodiment, the time it takes for each of the two front (steering) wheels to rotate is monitored independently, and these two rotation intervals are compared to determined whether one front wheel is slipping with respect to the other. A warning indication is provided if significant front wheel "desynchronization" is detected.

In accordance with another aspect of the preferred embodiment of the present invention, the downward forces exerted by the truck load on left and right rear truck frame are measured periodically and compared. In the preferred embodiment, deflection of left rear and right rear independent truck suspension frame members is used as an indication of the loading of those frame members, and load is measured using strain gauges integrally installed within those frame members. The ratio of left rear to right rear loading is calculated periodically (in the preferred embodiment, a "pseudo-sliding window" averaging method is used to filter the loading data so as to provide noise rejection). A warning indication is provided if the calculated ratio indicates uneven rear truck loading (e.g., as might be caused by shifting of the load or other factors).

A highly useful audio visual user interface is also provided. In the preferred embodiment, this user interface includes four illuminating lamps and a speaker audio output. This interface is relatively unobtrusive when no hazardous conditions are detected, but virtually instantaneously alerts the driver whenever a hazardous or potentially hazardous condition arises.

A "low speed" operation is provided which reliably detects when the truck is moving at a relatively low speed and disables, in the preferred embodiment, the front wheel synchronization monitoring/alarm operation during such low speed operation.

Other features and advantages of the present invention include the following:

helps the truck driver to drive more safely;
helps to protect the vehicle; notifies driver if he/she has broken a leaf spring;
helps reduce risk of accident and most importantly, could possibly save lives;
utilizes state-of-the-art microprocessor based technology to provide higher reliability and extra performance;
includes an advanced switching power supply allowing the system to operate on 12-24 volts, positive or negative ground electrical systems without modification;
utilizes the latest low power CMOS circuit technology to reduce power and enhance reliability under all operating conditions;
sensor and associated circuitry offer high performance and immunity to external factors even in the worst operating conditions;
provides a rear loading alarm which is useful in warning the driver of excessive speed on curves and when the trailer rear end is reaching the possibility of sliding sideways or overturning;
reliably and instantly detects when the truck is hydroplaning on a wet road or is losing steering ability on an icy road surface;
preferred embodiment does not control the truck in any manner but instead has the function of alerting driver and providing him more time to react as his truck approaches an unsafe condition caused by trailer instability, a flat tire or tractor hydroplaning;
literally teaches the driver to drive more safely by providing him with more information he can use to make critical decisions with (decisions that could save property, money and most importantly, lives);
uses a windowing technique to reject false front wheel pulses and thereby discriminate between actual front wheel pulses and pulses attributed to noisy environment;
provides a low speed mode in which synchronization data from front wheels is ignored to allow for low speed maneuvering;
requires several successive front wheel interval measurements to be under the threshold before leaving the low speed mode and entering the active wheel synchronization mode in order to reject noise during low speed mode and prevent false alarms;
includes an advanced "pseudo-sliding window" technique to filter the rear load data, thus smoothing the data and eliminating sensitivity to noise sources;
provides variable gain load amplifiers, allowing the installer to compensate for variations in truck geometry, weight, sensor location and the like;
includes an automatic DC level setting circuit which eliminates the need for DC offset adjustments;
load cell amplifiers located in proximity to the load cells at the rear of the truck include a DC balance feature to null out signals with no load in the truck; and
automatic silence feature silences the alarm if it persists for more than an acceptable amount of time (thus eliminating the need to disconnect the unit or turn off power when a sensor or a system component failure causes a continuous false alarm).

BRIEF DESCRIPTION OF THE DRAWINGS

These and other features and advantages of the present invention will be better and more understood by studying the following detailed description of a presently preferred exemplary embodiment in connection with the attached sheets of drawings of which:

FIG. 6 is a side elevated view of a front proximity sensor and associated mounting bracket operatively connected to the truck front wheel shown in FIG. 3;

FIGS. 7A-7E are various elevated views of components of the mounting bracket shown in FIG. 6;

FIG. 11A is a flow chart of an exemplary interrupt routine performed by the microcomputer;

FIG. 11B is a graphical illustration of a windowing technique provided by the FIG. 11A interrupt routine to reject noise;

FIGS. 12-14 are more detailed flow diagrams of exemplary program control steps performed by the FIG. 9A-9C microcomputer.

DETAILED DESCRIPTION OF A PRESENTLY PREFERRED EXEMPLARY EMBODIMENT

A moving tractor-trailer or any other large motor vehicle (hereafter "truck") is relatively complex and difficult to control. In accordance with one aspect of the present invention, a stability monitoring and alarm system is provided which gives the truck driver additional information about the stability of his truck and warns him about various unsafe or potentially hazardous conditions.

Figure 1:
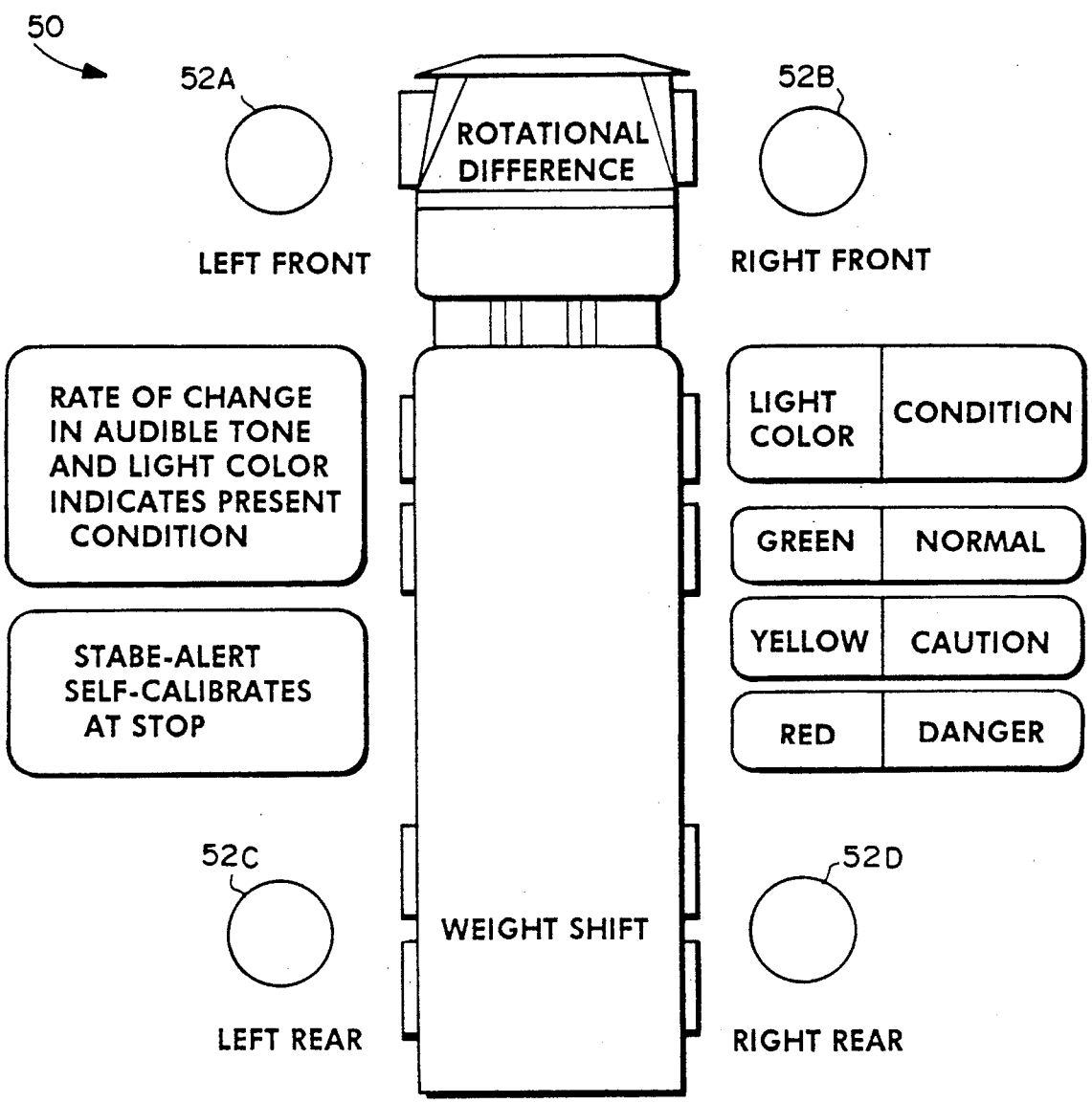
FIG. 1 is a schematic diagram of the presently preferred exemplary embodiment of a stability monitoring and alarm system display in accordance with the present invention.

In the preferred embodiment, this additional information is provided via a simplified and easy to rapidly understand display 50 shown in FIG. 1. Display 50 in the preferred embodiment includes a loudspeaker (not shown) and four dual light-emitting diode (LED) type illuminating elements 52a-52d—corresponding respectively to left front, right front, left rear and right rear. In the preferred embodiment, LEDs 52a,52b plus the speaker comprise means for indicating front wheel desynchronization; and LEDs 52c,52d plus the speaker comprise means for indicating rear (trailer) instability.

Whenever the stability monitoring and alarm system in accordance with the preferred embodiment is operating, each of these elements 52 is illuminated and is either green, yellow or red depending upon the conditions existing at that time. Green illumination corresponds to normal and safe operation. Yellow illumination cautions the driver that a potentially hazardous condition exists. Red illumination indicates that a dangerous condition exists and thus requests the driver to take immediate remedial action in order to avoid an accident or other catastrophe.

As mentioned, in the preferred embodiment, illuminating elements 52 are supplemented by an audible indication generated by a speaker 54 (not shown in FIG. 1). Speaker 54 provides audible tones and other sounds which in conjunction with illuminating elements 52 indicate the present condition of the motor vehicle.

Briefly, the stability monitoring and alarm system in accordance with the presently preferred exemplary embodiment of the present invention compares the rate at which the left front and right front truck wheels are spinning for degree of synchronization. Under ideal conditions when the truck is traversing a linear path, the left and right front wheels (which are capable of spinning independently in order to permit turning, as is well known) will be almost exactly in synchronization with one another. That is, the left front wheel will, under ideal conditions, rotate exactly 360° for every 360° rotation of the right front wheel. Slight differences in the left and right front wheel assemblies (e.g., due to unequal tire wear, normal bearing wear, or the like) may cause a slight difference in synchronization between the left and right front wheel. Moreover, every time the truck makes a turn, a difference in synchronization between the left and right front wheel occurs—and this synchronization difference is normal.

However, a substantial difference in synchronization between left and right front wheel rotation during high-speed operation typically indicates that a dangerous or potentially dangerous condition exists. For example, loss of front wheel traction (e.g., due to icy roads or hydroplaning on wet road surfaces) may cause one front wheel to "slip" with respect to the other and thus cause a loss of front wheel synchronization. In accordance with one aspect of the present invention, the synchronization between the left and right front wheels is monitored and loss of synchronization between them is indicated by illuminating elements 52a and/or 52b with yellow and/or red.

The presently preferred exemplary embodiment stability monitoring and alarm system in accordance with the present invention also monitors the stability of the rear of the truck. Load cells installed at the rear of the truck monitor the side and downward strain as conditions remain safe or change over the road. These load cells sense side-to-side "sloshing" and metal strain as weight becomes evenly distributed. Such uneven weight distribution may be due to shifting of the load, an improperly loaded vehicle, a heavily loaded vehicle travelling around a curve at an excessive speed, and/or failure of a mechanical element of the trailer (e.g., a flat rear tire or a broken leaf spring). Uneven weight distribution is indicated by illuminating elements 52c and/or 52d of display 50 with either yellow or red to indicate caution or an existing dangerous condition, respectively.

In operation, the truck driver may occasionally glance at display 50 (which may be mounted on the truck dashboard or overhead in the cab) to ensure that all illuminating elements 52a-52d show green. Meanwhile, speaker 54 may provide periodic audio signals (e.g., a "chirp" once every minute or two) to ensure the driver that the stability monitoring and alarm system is operating properly and that no hazardous conditions have been detected. When the stability monitoring and alarm system in accordance with the present invention detects a hazardous condition, it illuminates an appropriate one (or more) of illuminating elements 52a-52d with either yellow or red, and also causes speaker 54 to emit an appropriate tone (thus, the truck driver will be informed of the hazard even if he is not looking at display 50). In the preferred embodiment, the pitch and repetition rate of audible tones produced by speaker 54 indicates the type of hazard in conjunction with the selective illumination of various ones of illuminating elements 52a-52d with appropriate yellow or red hazard colors.

In the preferred embodiment, the left front illuminating element 52a and the right front illuminating element 52b will show yellow when front wheel desynchronization is detected—with the element corresponding to the slower rotating one of the two front wheels being illuminating (an assumption is made in the preferred embodiment that a front wheel will probably never rotate more rapidly than normal). The left rear illuminating element 52c and right rear illuminating element 52d are capable, in the preferred embodiment, of showing either yellow or red depending upon the severity of a detected load imbalance. Specifically, the illuminating element 52c, 52d which corresponds to the side of the truck bearing the most load in an imbalanced condition is illuminated, with this illuminating element being illuminated yellow or red depending upon the degree of load imbalance. Speaker 52 generates a lower pitched audio tone pulse at a moderate repetition rate whenever one of illuminating elements 52a–52d is illuminated with yellow, and emits a higher pitched tone pulse at a high repetition rate whenever one of illuminating 52c, 52d is illuminated with red. Different distinguishable audible tone signals may be used for indicating front wheel desynchronization and rear load imbalance, respectively, if desired.

Figure 2:
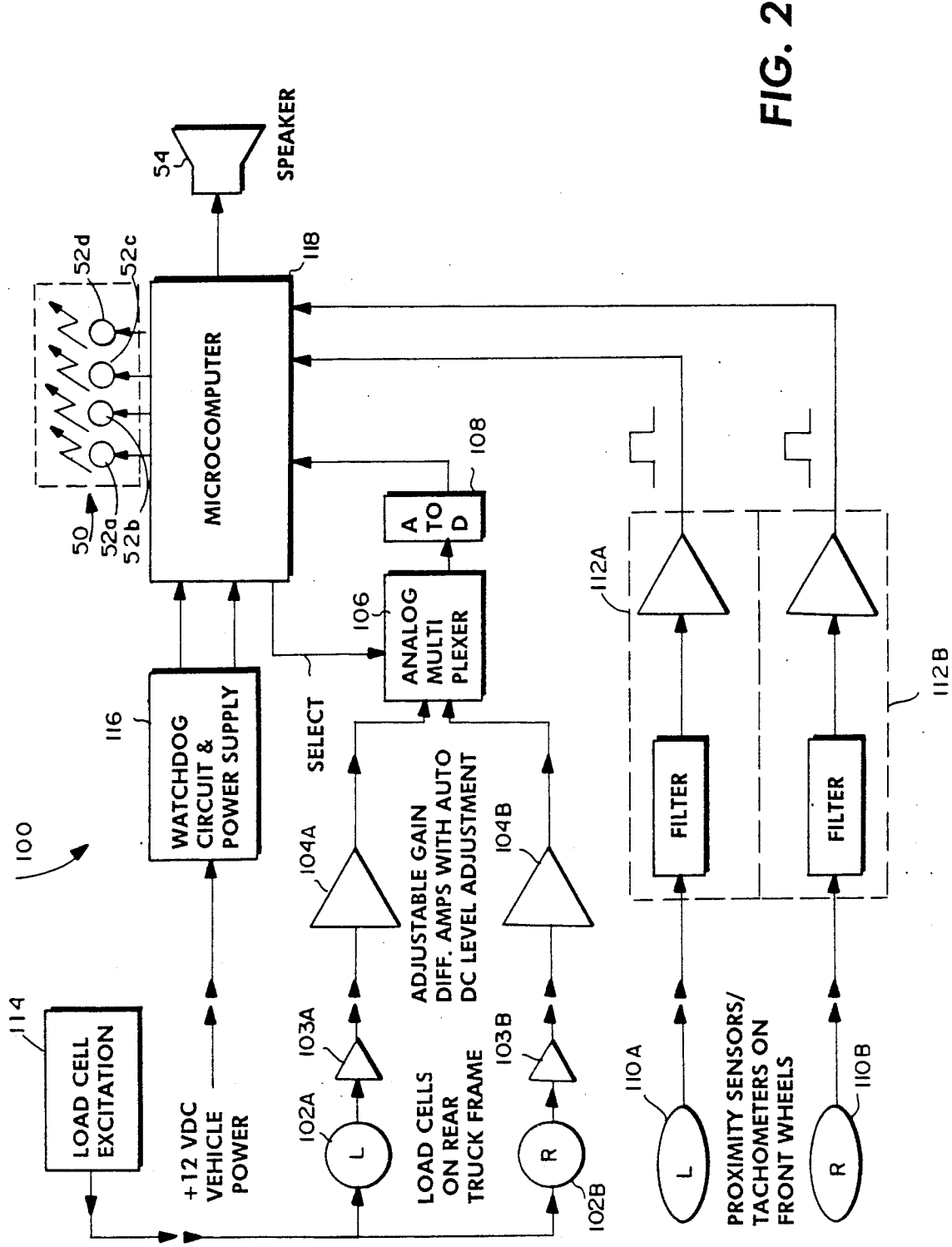
FIG. 2 is a schematic block diagram of the presently preferred exemplary embodiment of a stability monitoring and alarm system in accordance with the present invention, this system providing the FIG. 1 display.

FIG. 2 is a schematic block diagram of a presently preferred exemplary embodiment of stability monitoring and alarm system 100 in accordance with the present invention. In the preferred embodiment, system 100 includes display 50 shown in FIG. 1; a speaker 52; left and right rear load cells 102a, 102b (these are mounted on the rear truck frame on the preferred embodiment), associated preamplifiers 103a, 103b, adjustable gain differential amplifiers 104a, 104b, analog multiplexer (MUX) 106 and analog-to-digital converter (A/D) 108; left and right front proximity sensors 110a, 110b (these proximity sensors are operatively coupled to the left and right front truck wheels in the preferred embodiment); a load cell excitation signal generator 114; a watchdog circuit/power supply 116; and a microcomputer 118.

Briefly, in the preferred embodiment, DC vehicle power is applied to the input of watchdog circuit/power supply 116. Power supply 116 regulates the inputted vehicle power (e.g., to eliminate voltage variations and spikes that may occur due to operation of other truck electrical devices) and provides various constant regulated supply voltage inputs (e.g., +12 volts DC, +8 volts DC and +5 volts DC). Power supply 116 provides power for all of the remaining components of system 100. Load cell excitation signal generator 114 provides a balanced DC excitation voltage to the input of load cells 102a, 102b.

In the preferred embodiment, load cells 102a, 102b include conventional strain gauges of the type which require a balanced excitation voltage, and produce differential output signals indicating the amount of force applied to them. In the preferred embodiment, load cells 102a, 102b are installed within left and right rear truck frame members (as will be described in detail shortly) and monitor the strain of the left and right rear truck frame elements, respectively.

In the preferred embodiment, load cells 102a, 102b include local active preamplifiers 103a, 103b, respectively, installed close to the strain gauges. These preamplifiers amplify the relatively low differential signal levels outputted by the strain gauges to a sufficiently high amplitude to be transmitted with good signal-to-noise ratio over cables to amplifiers 104a, 104b (which in the preferred embodiment are installed near display 50 in the truck cab). Amplifiers 104a, 104b in the preferred embodiment are differential amplifiers having adjustable gains with automatic DC level (offset) adjustments. These amplifiers 104a, 104b have their gains adjusted beforehand (e.g., via potentiometers to be described shortly) in order to provide sufficient signal amplitude and to eliminate differences between left and right load cell signals caused by variations in the strain gauges or other factors. Amplifiers 104a, 104b convert the differential signals provided by load cells 102a, 102b into signal amplitude levels for input to analog MUX 106 (as will be explained in greater detail shortly).

Microcomputer 118 provides a selection signal to analog MUX 106—thereby controlling which of (a) the amplifier 104a output, and (b) the amplifier 104b output is to be passed on the A/D converter 108 for digitization. A/D converter 108 (a conventional analog-to-digital converter) converts the analog signal level applied to it into digital form and applies the resulting digital signals to the input of microcomputer 118 for further processing in the digital domain.

Left and right proximity sensors 110a, 110b in the preferred embodiment are operatively coupled to the truck left front wheel and right front wheel, respectively, and monitor front wheel rotation. More specifically proximity sensors 110a, 110b are conventional crastin, weather sealed and corrosion-proof inductive proximity sensors that count pulses as targets permanently mounted on front wheels pass in front of the sensors as the wheels spin. The manner in which these conventional sensors are mounted in proximity to the front wheels and the type of targets they sense passage of will be explained in greater detail shortly. Proximity sensors 110a, 110b provide a signal pulses whenever their associated targets pass before them.

These proximity sensor signal pulses are applied to filtering/thresholding circuits 112a, 112b, respectively. Filtering/thresholding circuits 112a, 112b condition the signal pulses outputted by proximity sensors 110a, 110b to provide noise immunity/rejection and to generate relatively "clean" digital pulses having timings and durations corresponding to proximity of proximity sensors 110a, 110b with their associated wheel targets. These digital pulses outputted by filtering/thresholding circuits 112a, 112b are inputted directly to microcomputer 118, and in the preferred embodiment drive interrupt routines which measure the intervals between successive pulses (as will be explained).

In the preferred embodiment, microcomputer 118 includes an internal non-volatile memory storing program control instructions which determine the functions performed by the microcomputer. Briefly, microcomputer 118 periodically acquires (via A/D converter 108) data specifying the forces measured by load cells 102a, 102b and compares those measured forces with one another. A significant difference in the loads measured by load cells 102a, 102b causes microcomputer 118 to illuminate with yellow or red one or the other of display illuminating elements 52a and 52d, and also to generate an audible warning signal via speaker 52.

Microcomputer 118 in the preferred embodiment also periodically measures the time interval between successive pulses produced by proximity sensor 110a and periodically measures the time interval between successive pulses produced by proximity sensor 110b. Microcomputer 118 compares these two time intervals. If one time interval is significantly longer than the other (indicating that one of the truck front wheels is rotating much more slowly than the other), microcomputer 118 generates an audible and visual warning indication via display illuminating elements 52a, 52b and speaker 54.

Figure 3:
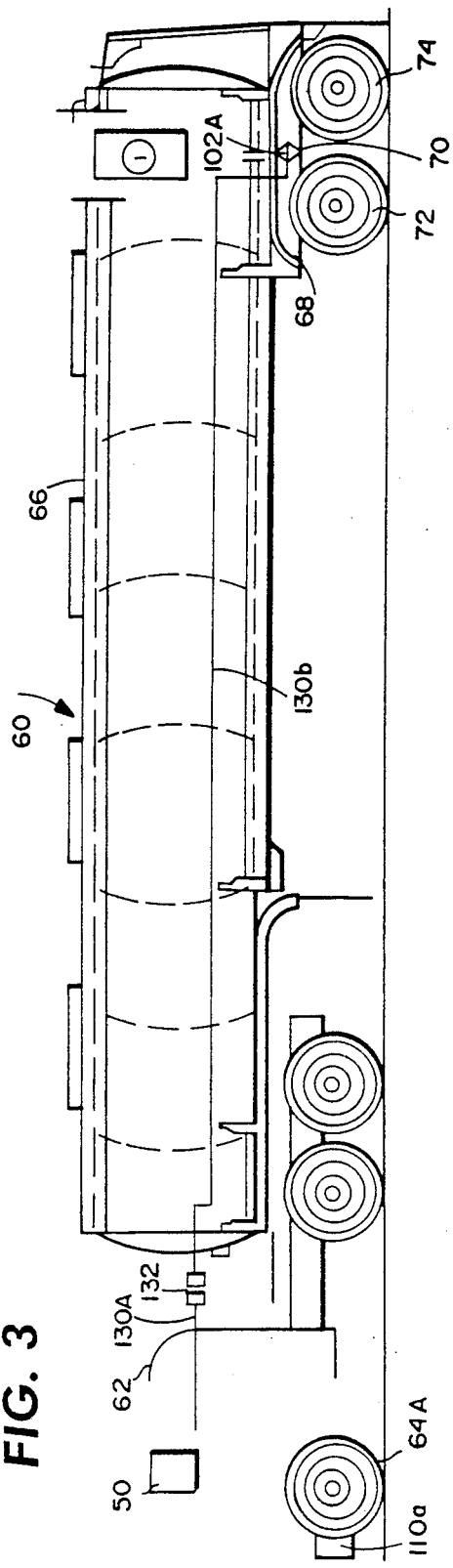
FIG. 3 is a schematic illustration of various components of FIG. 2 system installed in an exemplary tanker truck.

FIG. 3 is a simplified schematic illustration of an exemplary truck 60 of the type system 100 is particularly useful in monitoring the stability of. As is well known, truck 60 includes a cab 62 ("tractor") housing the truck driver, his/her operating controls, and the truck power plant. Display 50 (plus various other components of system 100 including microcomputer 118) are housed within cab 62 in the preferred embodiment. Attached to cab 62 are truck front wheels 64a, 64b, as is well known. These front wheels 64 are, of course, operatively coupled to the truck steering system and control the direction the truck is traveling. Left proximity sensor 110a is operatively coupled to left front truck wheel 64a, and similarly, right proximity sensor 110b is operatively coupled to right front truck wheel 64b (not shown).

Cab 62 is detachably coupled to trailer 66 in the configuration shown, as is well known. While FIG. 3 shows a conventional liquid tank-type trailer 66, this example by no means limiting as system 100 may be used with virtually any type of motor vehicle such as trailers and tractor/trailer combinations (e.g., dry bulk, logger, platform, drop frame, dump, reefer, deep drop, automobile transporter, van, doubles, etc.) and also with trucks without detachable trailers (e.g., dump trucks, fuel trucks, tandum-axel vans, fire engines, cement mixers, etc.).

In the preferred embodiment, a multi-conductor cable 130 traverses the length of truck 60 from cab 62 to rear "dolly" 68. In the preferred embodiment, a quick disconnect-type conventional electrical connector assembly 132 allows the portion of cable 130b mounted on trailer 66 to be disconnected from the portion of cable 130b installed within cab 62 (thus, facilitating exchange of trailers). Rear load cells 102a, 102b are installed within a rear frame member 70 of trailer 66 in the preferred embodiment and monitor the load over the left rear wheels with respect to the load over the right rear wheels. Preamplifiers 103a, 103b are installed at rear load cell 102a, 102b, respectively, to amplify the respective signal levels sufficiently to traverse the lengthy cable 130 from the rear to the front of truck 60 with good signal-to-noise ratio.

Figure 4:
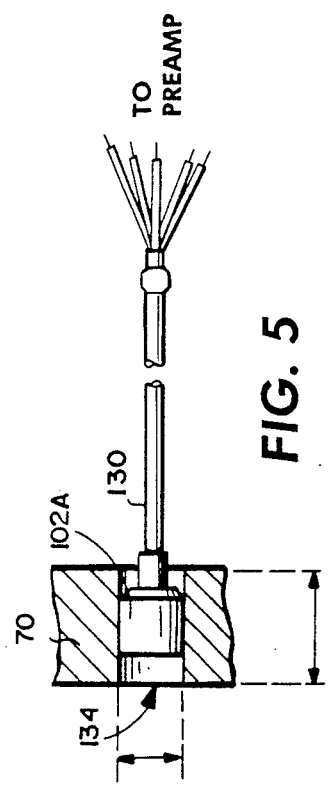
FIG. 4 is a schematic illustration of an exemplary installation configuration for rear load cells of the FIG. 2 system.

FIG. 4 is a more detailed illustration of the position of installed load cell 102a. As can be seen in FIG. 4, load cell 102a is actually installed integrally within a rear truck frame member 70 in the area in which the load force is transferred from trailer 66 to rear truck wheels 72, 74. Load cell 102a is press-fit into a precision hole formed in frame member 70 in the preferred embodiment, thus making it integral to the frame 70 of trailer 66. Sensor location varies depending upon the type of trailer used. In general, it is desirable to install load cells 102a in portions of the rear truck frame which actually transmit the load force from the trailer 66 to the rear truck wheels 76, 74.

Figure 5:
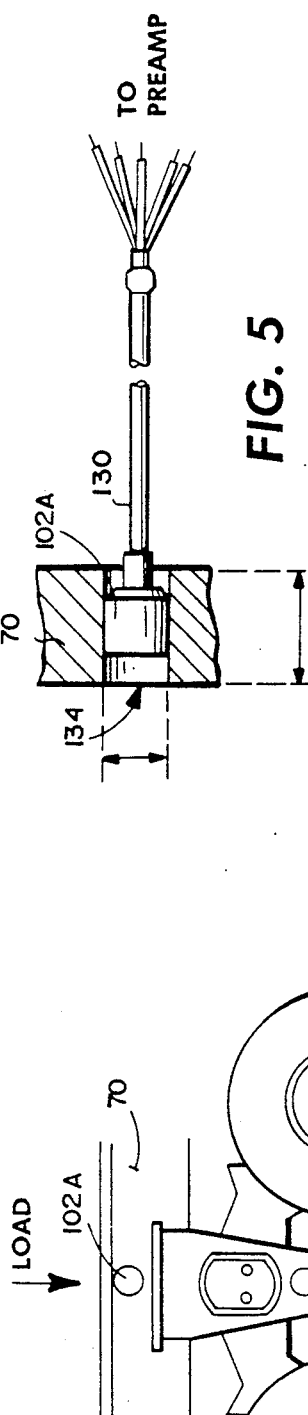
FIG. 5 is an elevated view in cross-section of rear load cell of the FIG. 2 system as installed within the rear frame member of the FIG. 3 truck.

FIG. 5 is an illustration of installed load cell 102a. As can be seen from FIG. 5, load cell 102a in the preferred embodiment comprises a conventional off-the-shelf strain gauge (e.g., of the type manufactured by Revere Corporation of America, Wallingford, Conn. and described in U.S. Pat. No. 4,530,245) having a substantially cylindrical outer casing. In the preferred embodiment, a precision circular hole 134 having a diameter of 0.751 inches plus or minus 0.001 inch is drilled through frame member 70 and load cell 102a is pressed into this precision hole 134 with cable 130 leading out of the load cell 102a into a preamplifier 103a (not shown). Load cell 102a has a cylindrical outer shell with a knurled outer surface portion so that its overall diameter is slightly greater than the diameter of the hole 134 in which it is inserted, and thereby measures stress produced in member 70 by sensing deformation of the hole.

Figure 5A:
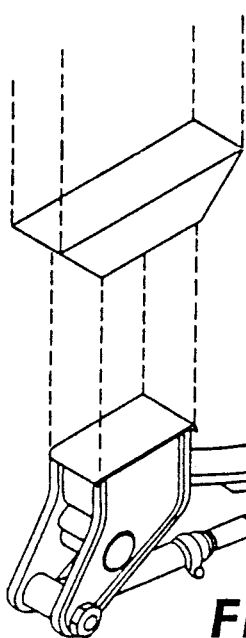
FIGS. 5A-5F are various views of a method for installing a load cell into the frame member as shown in FIG. 5.
Figure 5B:
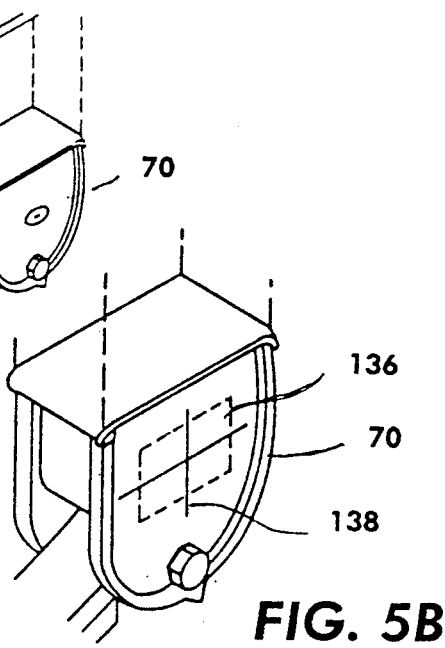
Figure 5C:
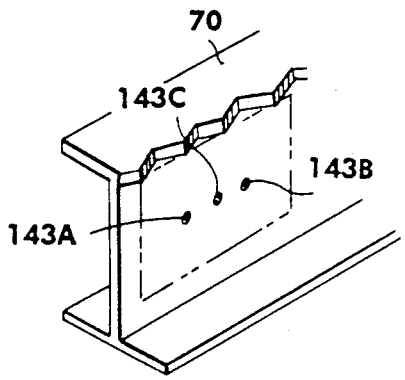
Figure 5D:
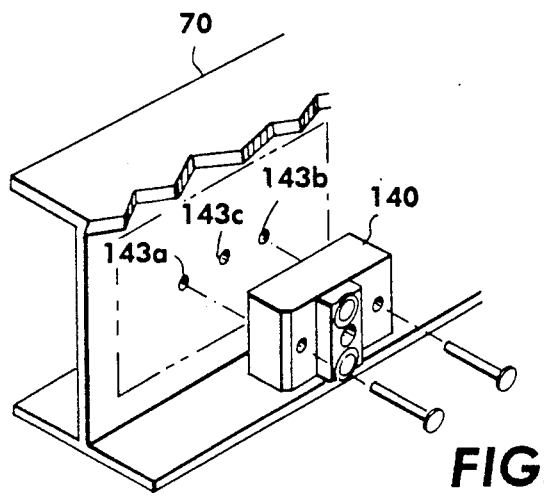

FIGS. 5A–5F show in detail one exemplary method for installing load cell 102a into a trailer 66. FIG. 5A is an illustration of a conventional dual-spring type suspension mounting found in many types of trailers 66, and FIG. 5B is a more detailed illustration of a frame member 70 in which load cell 102 may be installed. In the preferred embodiment, the frame member 70 selected for mounting of load cell 102 should have a minimum thickness of 0.160 so that the load cell can accurately respond to force transmitted through the frame member.

To mount load cell 102, the center of the frame member 70 is first located and then a vertical line 138 about three inches long is scratched into the frame member. A sensor mounting template 136 (available from Revere Corporation of America) is then placed on the frame member 70 so its notches are aligned with the vertical centerline 138. Three holes 143A–143C are then punched and drilled using the template (see FIG. 5C). The two outer holes 143A, 143B are used to temporarily mount an installation tool 140 (also available from Revere Corporation) to the frame member 70 to facilitate installation of the load cell 102, while the center hole 143C becomes the hole 134 into which the load cell 102 is press fitted.

Installation tool 140 is then bolted to frame member 70 using mounting holes 143A, 143B with its chamfered edge against the frame member 70 (see FIG. 5B). A precision ¾ inch counterbore of conventional design is then used to drill hole 142 through frame member 70 using installation tool 140 as a guide.

Installation tool 140 is used to critically align the counterbore and thus assure that the counterbore does not wander or become disaligned with respect to frame member 70 and pilot hole 143c. Once the hole 134 is drilled, installation tool 140 may be unbolted from the frame member 70 and the hole thoroughly cleaned of metal shavings and the like. A stain sensor alignment mark is then made on the frame member to facilitate proper (rotational) alignment of load cell 102.

Figure 5E:
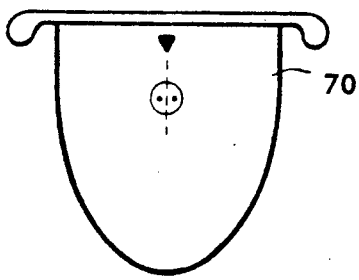
Figure 5F:
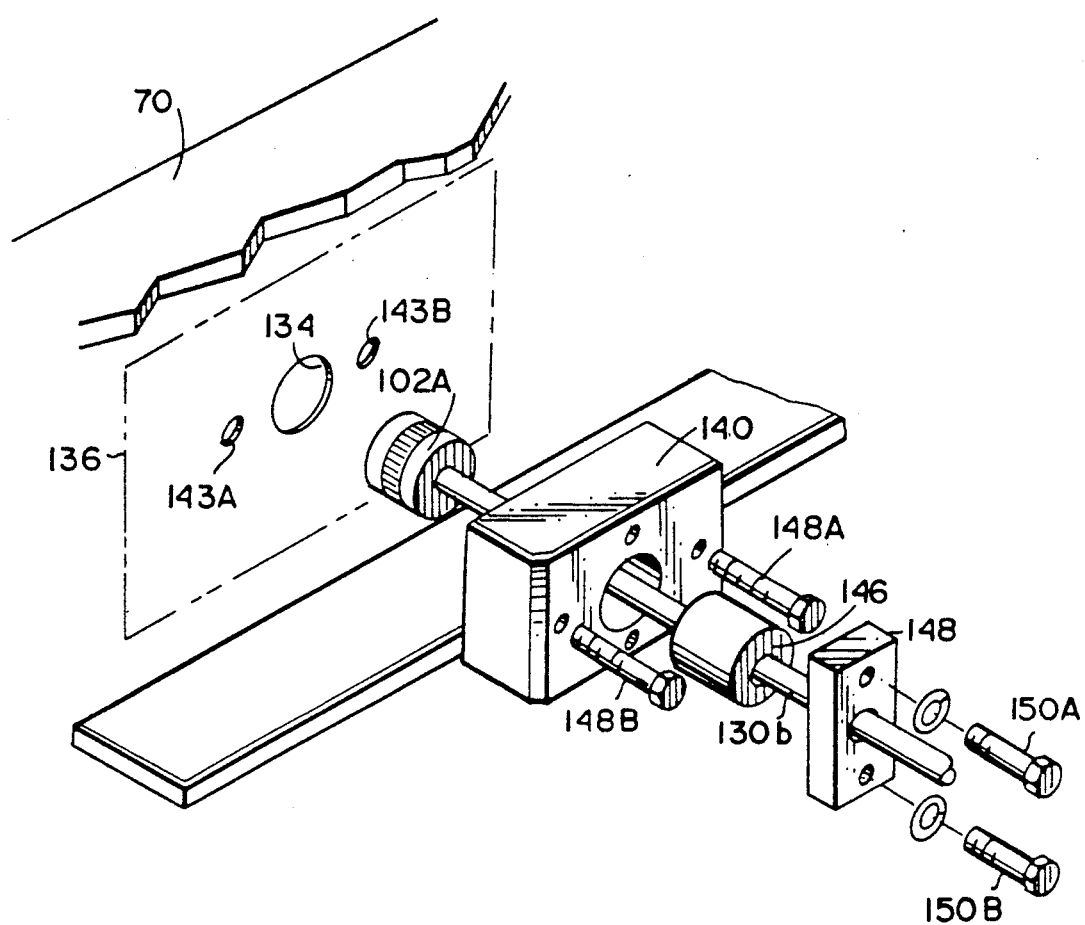

The load cell 102A must be carefully aligned so that it can measure maximum stress. FIG. 5E schematically illustrates the proper alignment of load cell 102A with respect to frame member 70. The conventional strain gauge used for load cell 102A in the preferred embodiment is marked with a dimple, and this dimple is at a right angle with the force change.

In the preferred embodiment, installation tool 140 is used once again to press-fit the load cell sensor into the hole 142 and to prevent damage to the sensor while aligning the sensor. The installation tool 140 is now positioned so that the chamfered or notched side is away from the sensor location and an associated pushplate 148 is aligned with installation tool holes 143A, 143B (see FIG. 5F) and bolted to the tool. A ¾ inch bushing 146 is inserted into the inner bushing of the installation tool 140 from the rear, the outer surface of sensor 102A is sprayed with open gear lubricant, and the cable 130b is drawn through the center of the installation tool 140, the bushing 146, and the pushplate 148 (see FIG. 5F). The sensor 102A imprint is aligned with the alignment mark (see FIG. 5E) and the installation tool is mounted to the frame member 70 via bolts 148 and holes 143. The sensor 102 is then realigned (since during sensor 102 installation the strain sensor imprint must be kept within 3 degrees of the alignment mark). If the sensor is out of angular alignment, maximum stress levels cannot be measured. Bolts 150 are finger tightened to snug the pushplate 148 up against the installation tool 140, and the bolts are alternately tightened ¼ turn until the sensor 102 is exactly in the center of the frame member 70. The sensor 102 is now press fitted integrally within frame member 70 and the installation tool 140 may be removed. Installation of load cell 102 is completed by mounting its associated preamplifier 103 on or near frame member 70 in a convenient position and connecting cable 130 appropriately in a conventional manner. Load cell 102B must be mounted in a similar manner to a frame member at the right rear of the trailer 66—and preferably in a symmetrical location with respect to the location of load cell 102A.

As mentioned above, installed load cell 102 measures the strain produced within frame member 70 by the portion of the truck load the frame member bears. Generally, frame member 70 bears some load even when the trailer 66 is empty—and this "empty" loading is compensated for by adjusting preamplifiers 103 as will be explained shortly. Frame member 70 deforms under the weight of a load placed within trailer 66, and load cell 102 measures the amount of deformation of the frame member (e.g., by effectively measuring the change in shape/diameter of hole 134 due to the deformation of the frame member). Thus, in the preferred embodiment, by measuring the deformation of a mechanical load-bearing member within the rear suspension of trailer 66, load cell 102 is capable of indirectly measuring the force of gravity exerted by the load carried by trailer 66 onto each set of the rear truck wheels.

FIG. 6 is an elevated view of an exemplary mounting arrangement 162 for front right proximity sensor 110B. In the preferred embodiment, proximity sensors 110 each comprise a conventional inductive type proximity sensor which produces an output signal whenever its sensing plane is moved into proximity with a ferromagnetic target surface (in the preferred embodiment, the proximity sensors are current devices which draw different amounts of current depending upon whether their poles surfaces are close to a ferromagnetic surface). Targets 160 are installed on each of the two front wheels 64. In the preferred embodiment, a single target 160b (shown in detail in FIG. 7E) is installed on the truck front wheel 64b and sensor 110 is mounted in proximity to the wheel (e.g., 12 mm away from the target when the target is in registry with the sensor) so that the target moves into proximity with the sensor exactly once per revolution of the wheel (and thus, the sensor produces an output signal once per wheel revolution in the preferred embodiment).

In the preferred embodiment, sensor 110 is supported in proximity with the wheel 64 and target 160 by a special mounting bracket 162. FIGS. 7A-7D show in detail the different portions of bracket 162. In the preferred embodiment, mounting bracket 162 includes a mounting base 164 (FIGS. 7A and 7B show two different mounting base configurations); an angle bracket 166 (see FIG. 7D); a sensor bracket 168 (see FIG. 7C); and various nuts, bolts and washers. To install mounting bracket 162, the bolts 170 holding the top plate of the truck kingpin are removed and a mounting base 164 is selected and installed using bolts and lock washers. In the preferred embodiment, mounting base 164 includes a circular plate 172 having a flat edge 174 and defining three substantially equally spaced apart slotted holes 176 about its circumference. A larger hole 178 in the center of plate 172 provides a space for a kingpin grease fitting to protrude (see FIG. 6). The grease fitting can be changed to a 45 degree type (shown in FIG. 6) if necessary to provide access for lubrication.

Mounting base 172 further includes an upwardly extending tab 180 having a longitudinal slot 182 therein. The angle the tab 180 makes with the plate 172 is a function of the type of truck system 100 is being installed into. In the preferred embodiment, mounting base 172 is provided in two different types the type shown in FIG. 7A (in which the tab 180 makes an angle of approximately 55 degrees with plate 172); and the type shown in FIG. 7B (in which the tab 180 is substantially perpendicular to plate 172). Slot 182 may be 0.85 inches long in the FIG. 7A configuration and about 0.45 inches long in the FIG. 7B configuration to provide room for adjustment.

Angle bracket 166 in the preferred embodiment comprises a narrow elongated planar member having rounded ends, a longitudinally-disposed slot 184 at one end and a circular hole 192 cut at the other end at a position slightly offset from the center line 191 of the member. Angle bracket 166 is installed to mounting base 164 by passing a bolt through slot 184 (which may be 1.45 inch long) and through mounting base slot 182. Sensor 110 is then installed onto sensor bracket 168 by passing the sensor through a circular hole 184 in the sensor bracket and loosely fitting a nut. In the preferred embodiment, sensor bracket 168 (shown in FIG. 7C) includes a large planar portion 186 defining hole 184 therethrough, and meeting at an 80 degree angle with a tab portion 188 having four mounting holes 190 cut through it. Tab portion 190 is then mounted to angle bracket 166 (via hole 192 cut through the angle bracket at its end 194 opposite the end where slot 184 is located) with a bolt so that the pole surface 196 of the sensor 110 is facing the brake drum of wheel 64.

To attach target 160 to the wheel 64, the area on the brake to which the target is to be attached is first cleaned and then an epoxy or other type welding material is used to adhere the target to the brake drum. In the preferred embodiment, target 160 (see FIG. 7E) includes two planar portions 200, 202 of ferromagnetic material attached to one another by mounting screws 204. Portion 202 is used to provide a surface area for mounting to wheel 64, while portion 200 provides the surface area for disrupting the magnetic field of sensor 110. In the preferred embodiment, the portion 202 used to mount to the wheel may have dimensions of 1 inch by 1.750 inches, while the other portion 200 may be 1 inch by 1 inch square in dimensions.

Once the target 160 is installed on wheel 64, it is moved (if necessary) into registration with sensor 110 and the position of brackets 166, 168 are adjusted relative to one another and relative to mounting base 164 to provide a clearance of ¼ inches to ½ inches between the sensor pole surface 196 and the target portion 200.

Figure 8A:
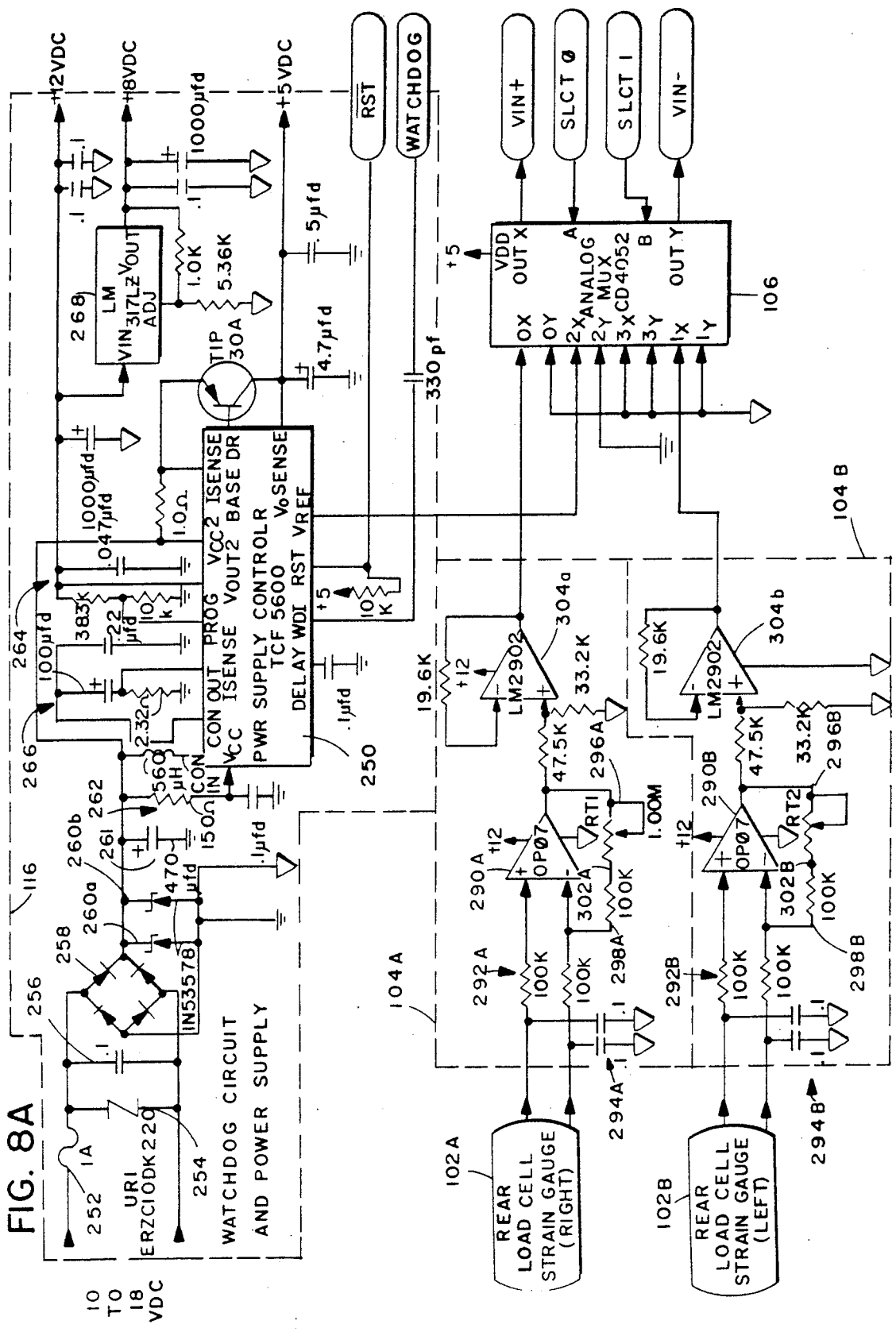
FIGS. 8A-8B together are a detailed schematic diagram of analog signal processing circuitry of the FIG. 2 system.
Figure 8B:
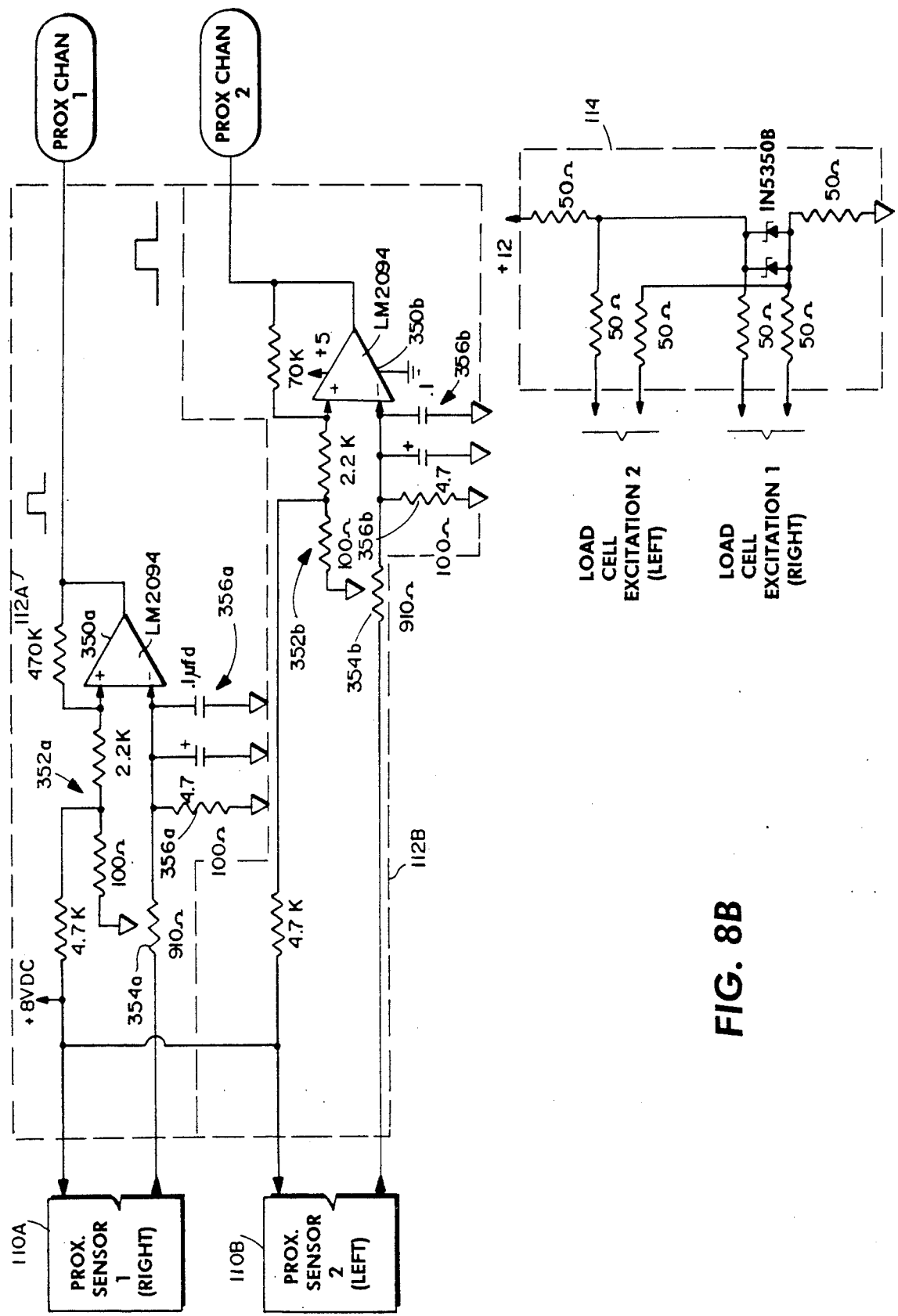

FIGS. 8A and 8B are together a detailed schematic diagram of analog signal processing circuitry portions of system 100 shown in FIG. 2. FIGS. 8A and 8B will now be described in detail beginning with power supply block 116.

The heart of power supply block 116 shown in FIG. 2 in the preferred embodiment is a conventional monolithic switching type power supply controller 250 type TCF 5600 providing various different programmable regulated voltage output levels. Data about the operation and functionality of this conventional off-the-shelf device may readily be obtained from the manufacturer. The incoming vehicle power supply is coupled to the Vcc and Vcc2 inputs of controller 250 after being fused by a fuse 252, filtered by a transient suppressor 254 and by a parallel-connected capacitor 256, rectified by a full wave bridge rectifier 258, voltage limited ("clamped") with zener diodes 260a, 260b, further filtered with a large capacitor 261, and passed through a series 150 Ohm resistor and associated 0.1 microfarad capacitor forming an RC network 262. A programming network 264 sets the voltage output levels, while an inductively coupled current sense network 266 monitors output current to provide current regulation (overcurrent protection). The Vout2 terminal provides +12 VDC which is used after some further filtering (by various capacitors) as a supply voltage for the remainder of system 100. A further monolithic voltage regulator circuit 268 (e.g., type LM317LZ) regulates the +12 VDC level down to +8 VDC required for proximity sensors 110. The V$_O$sense output of device 250 provides regulated +5 VDC which is capacitively filtered before being provided to other portions of system 100.

The WDI output of device 250 is connected to an output of microcomputer 118 as a "watchdog" input. The RST output of device 250 is applied to the Reset input of microcomputer 118 to reset the microcomputer upon initial application of power to the system 100 (and upon too long a time period elapsing since the microcomputer last pulsed the WDI input). The $V_{ref}$ output of device 250, on the other hand, is connected to an input of MUX 106 so that the microcomputer 118 can monitor its level via A/D converter 108.

The outputs of rear load cells 102A, 102B (actually from the preamplifiers 103a, 103b located near the load cells) are applied to respective filtering/thresholding circuits 104A, 104B. These circuits 104A, 104B convert the true differential outputs of the preamplifiers 103a, 103b, respectively into non-differential signal levels for application to the inputs of MUX 106.

Load cell excitation signal generator 114 shown in FIG. 8B is connected via cable 130 to provide excitation to load cells 102a, 102b. In the preferred embodiment, load cells 102a, 102b each require an excitation voltage of +12 VDC. The various resistors and zener diodes included within load cell excitation signal generator 114 are included so as to prevent any possibility of sparks being generated along or at the termination of cable 130 (and thus help to make system 100 safe for trailers 66 carrying flammable materials).

Figure 10:
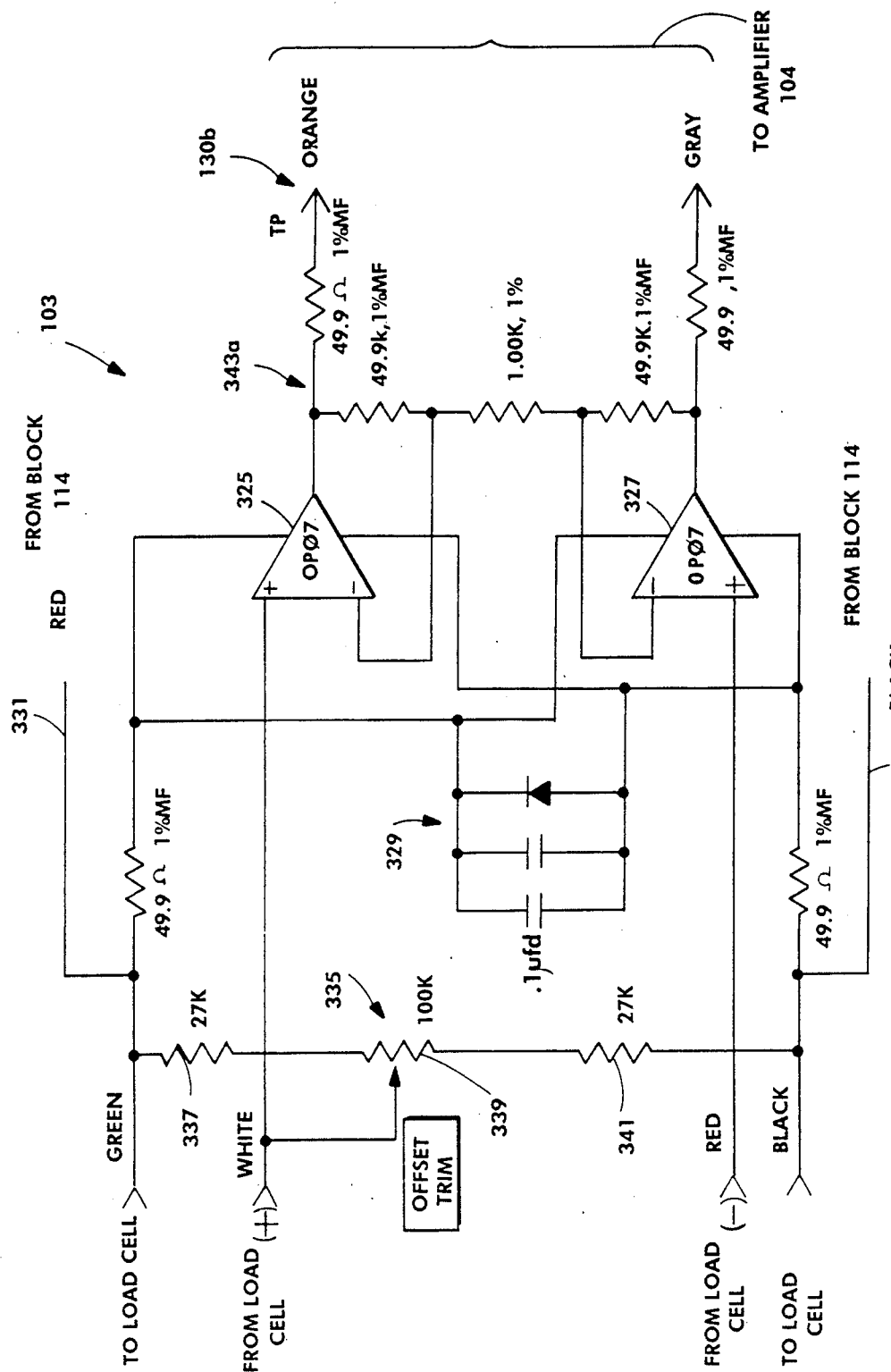
FIG. 10 is a detailed schematic block diagram of an exemplary load cell preamplifier circuit used with the preferred embodiment FIG. 2 system.

FIG. 10 is a detailed schematic diagram of an exemplary one of the two identical load cell preamplifiers 103a, 103b. As can be seen, preamplifier 103 includes two operational amplifiers 325, 327 connected in a differential amplifying configuration with a floating AC ground by network 329. Power is supplied to preamplifier 103 from load cell excitation signal generator 114 via conductors 331, 333—which conductors also supply excitation voltage to load cell 102. The differential output signal provided by the load cell 102 is connected across the non-inverting inputs of op amps 325, 327. An offset trimming network 335 including a series connected resistor 337, a potentiometer 339 and another resistor 341 are connected across the excitation voltage provided by block 114. By adjusting potentiometer 339, it is possible to compensate for any DC offset in the load cell 102 output attributable to factors independent of loading of trailer 66 (e.g., truck geometry, load cell bias, or the like). The outputs of op amps 325, 352 are provided via a balanced resistor output network 343 to amplifier 104 over cable 130b.

Referring once again to FIG. 8A, each amplifier circuit 104 includes an operational amplifier 290 having its inverting and non-inverting inputs connected via symmetrical series input resistors 292 and shunt capacitors 294 to receive the differential output of the load cell preamplifier 103. Op amp 290 includes an adjustable feedback circuit including a 1 MegOhm potentiometer 296 in series with (i.e., connected at a node 302 to) a 100 KOhm resistor 298, with the potentiometer connected to the op amp output and the resistor connected to the op amp inverting input. The effect of this feedback loop is to cause op amp 290 to multiply one of the differential voltages applied to its input by its closed loop gain, and to multiply the other differential voltage applied to its input by (1 + the closed loop gain). This results in an "automatic" DC level setting function which eliminates the need for DC offset adjustments within blocks 104. Since the differential signal levels provided by the load cell preamplifiers typically have a relatively large common DC component, it is desirable to remove the DC component entirely and provide a signal proportional to only the voltage difference between the two differential inputs—and this is precisely what op amp 290 provides.

The single-ended output of op amp 290 is buffered and amplified by a further op amp stage 304. The two resulting outputs from blocks 104A, 104B are provided to respective inputs of MUX 106.

Referring now to FIG. 8B, proximity sensor filtering/thresholding circuits 112a, 112b respectively condition the outputs of right and left proximity sensors 110a, 110b and provide these outputs directly to microcomputer 118. In the preferred embodiment, filtering/thresholding circuits 112a, 112b are identical to one another and each include an operational amplifier 350 connected in a comparator configuration. The conventional proximity sensor 110 used in the preferred embodiment draws different amounts of current depending upon whether its pole face 196 is in close proximity to a ferromagnetic surface. In particular, in the preferred embodiment, the proximity sensors draw about 1 ma of current when not in proximity with target 160 and about 3 ma when in proximity with the target. Circuits 112 supply current to proximity sensors 110, measure the amount of current being drawn by the proximity sensor and convert the current into a voltage (digital level) for input to microcomputer 118. A voltage divider arrangement 352 connected to the op amp 350 non-inverting input provides a reference voltage to the non-inverting input of op amp 350 (this reference voltage is connected to the same +12 VDC supply voltage used to supply the proximity sensor 112 in order to eliminate the possibility of unreliable operation due to supply voltage fluctuation). The current drawn by proximity sensor 110 passes through resistors 354, 356 which together comprise a voltage divider circuit applying a voltage proportional to the current drawn by the proximity sensor to the op amp 350 non-inverting input. A filter capacitor arrangement 356 provides, in connection with resistors 354, 356, a low-pass filter function helping to prevent high frequency noise from triggering op amp 350.

When proximity sensor 110 and target 160 are not in registry with one another, only a relatively small (e.g., 1 ma) current flows through resistors 354,356. Thus, the voltage drop across resistor 354 is relatively small, and the voltage level applied to the op amp 350 inverting input is higher than the voltage level applied to the op amp 350 non-inverting input by reference voltage divider 352. This condition forces the output of op amp 350 low.

When target 160 moves into proximity with the proximity sensor 110 pole surface, the proximity sensor draws more current which increases the voltage drop across resistor 354. The voltage level applied to the op amp 350 inverting input subsequently falls to below the voltage level produced by reference voltage 352, and the output of op amp 350 rises to the "high" level (thus indicating that the associated truck front wheel has rotated to a position at which the target 160 is once again in registration with the proximity sensor 110). The comparator function performed by op amp 350 ensures that only signals from sensors 110 which are above a certain amplitude can result in signals being applied to microcomputer 118—thus providing immunity to low level noise. As will be explained, microcomputer 118 times the interval between successive output pulses produced by op amp 350a to determine how long it takes the right front truck wheel to rotate 360°; and likewise, independently times the interval of time between successive pulse outputs of op amp 350b to determine the rotation interval of the left front truck wheel.

Load cell excitation signal generator 114 shown in FIG. 8B is connected via cable 130 to provide excitation to load cells 102a,102b. In the preferred embodiment, load cells 102a,102b each require an excitation voltage of +12 VDC. The various resistors and zener diodes included within load cell excitation signal generator 114 are included so as to prevent any possibility of sparks being generated along or at the termination of cable 130 (and thus help to make system 100 safe for trailers 66 carrying flammable materials).

Figure 9A:
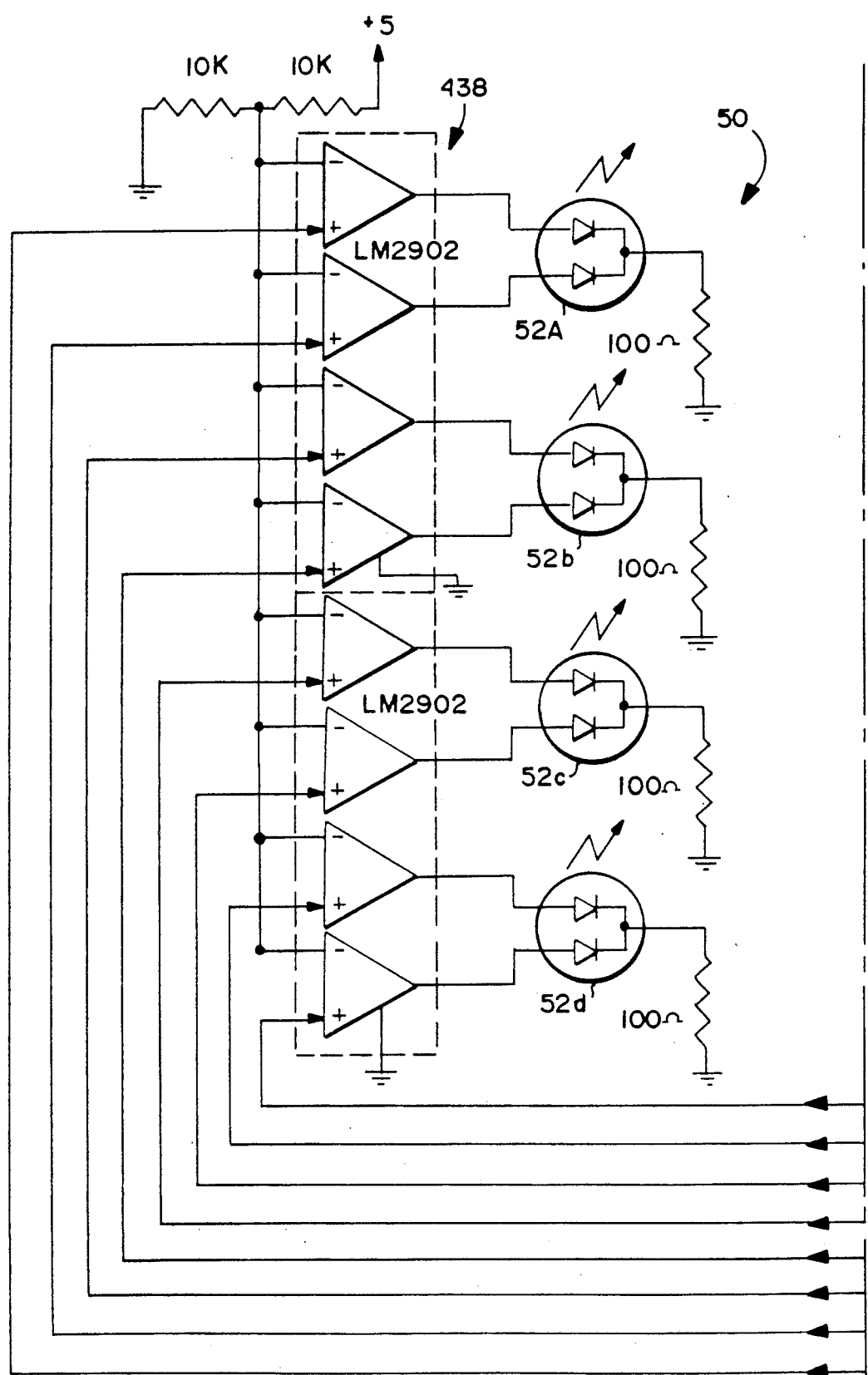
FIGS. 9A-9C are together a schematic block diagram of digital system processing circuitry of the FIG. 2 system.
Figure 9B:
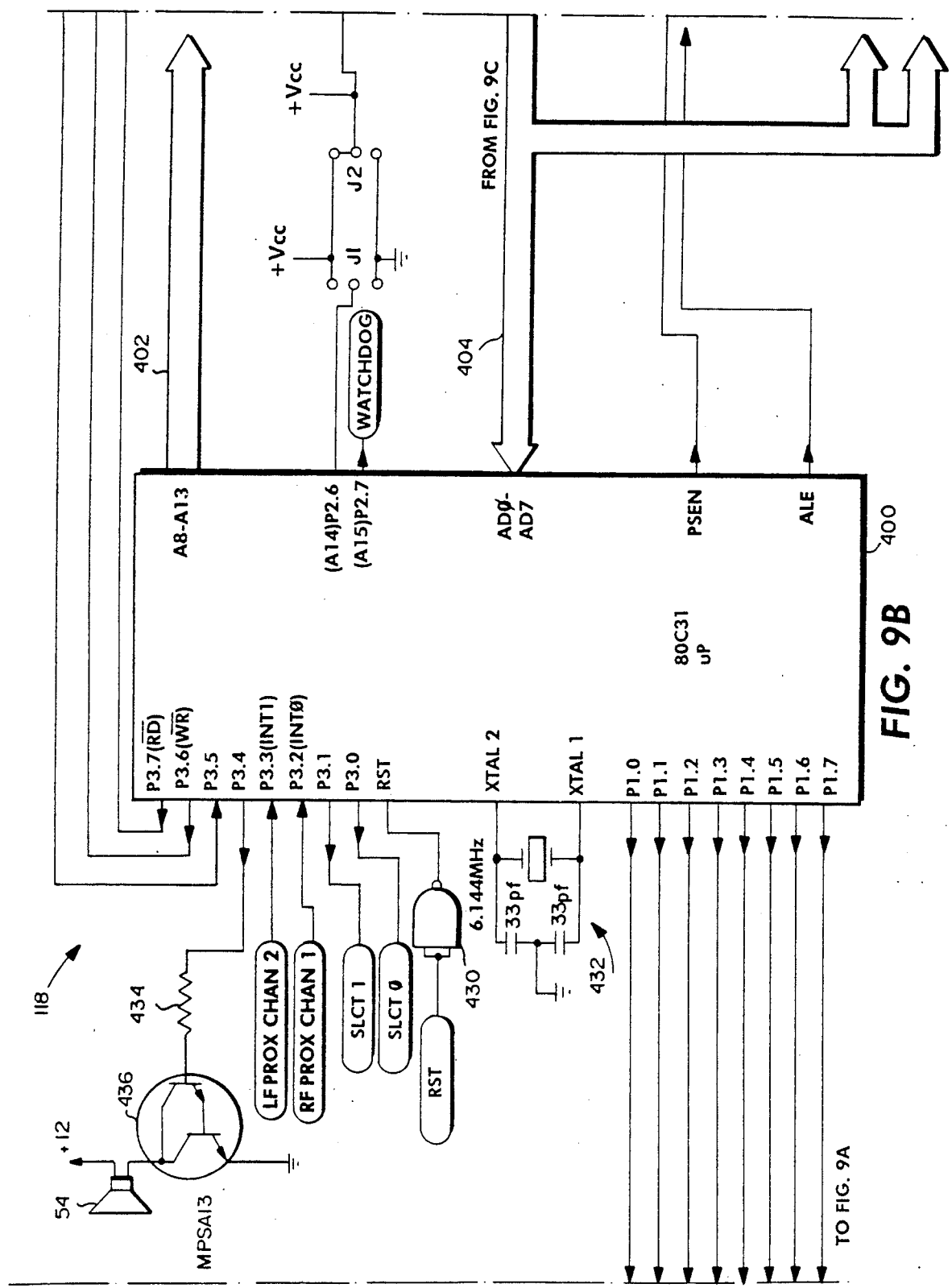
Figure 9C:
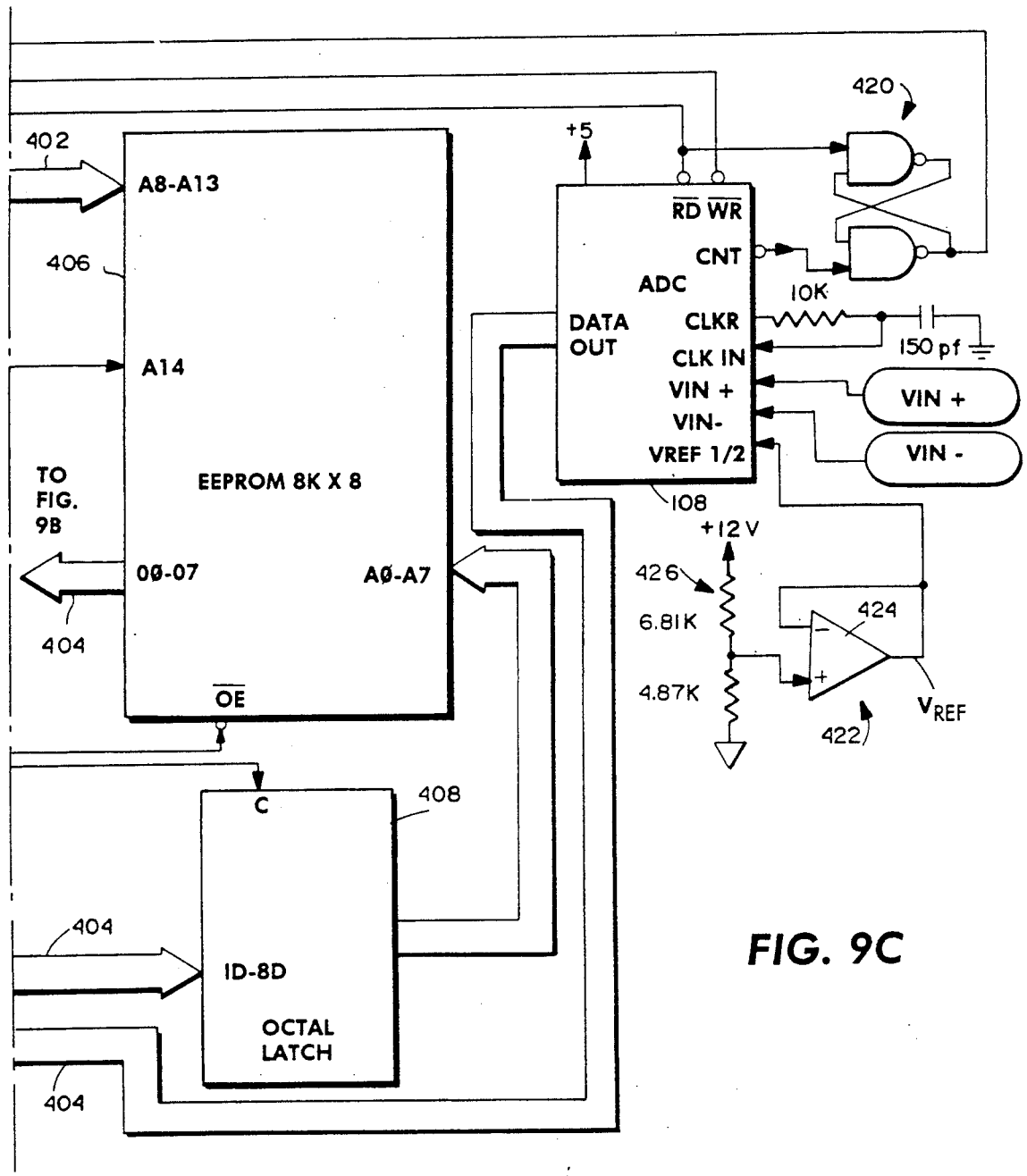

FIGS. 9A-9C are together a detailed schematic diagram of a digital circuitry portion of system 100 in the presently preferred exemplary embodiment of the present invention. The heart of system 100 is microcomputer 118—shown in FIGS. 9B and 9C. Microcomputer 118 in the preferred embodiment includes a type 80C31 microprocessor 400 connected by an address bus 402 and multiplexed address/data bus 404 to various peripheral devices including a program store EEPROM 406, an octal latch 408, and A/D converter 108. EEPROM 406 is a non-volatile store storing program instructions and associated data used to control the operation of microprocessor 400. Octal latch 408 is connected to address/data bus 404 and stores a first portion of a 14-bit address used to address EEPROM 406 (the other 6 bits being provided directly by microprocessor 400 via address bus 402). Microprocessor 400 addresses EEPROM 406 in a well known manner in order to retrieve program control instructions via the address/data bus 404. The PSEN and ALE outputs of microprocessor 400 are respectively used to strobe EEPROM 406 and to clear/load octal latch 408. A jumper J2 selectively applies a logic level ∅ or a logic level 1 to a high-order (15th) address bit of EEPROM 406 so as to permit selection between two different control programs (e.g., normal operation mode and testing mode) if desired.

Microprocessor 400 reads parallel data from A/D converter 108 via address/data bus 404. In the preferred embodiment, microprocessor 400 initiates a data acquisition operation of A/D converter 108 by simply strobing the WR input of the A/D converter. This "dummy" write operation causes A/D converter 108 (an entirely conventional A/D converter of, for example, type ADC∅8∅4) to convert the signals applied to its VIN+ and VIN− inputs into digital values which it then stores within internal registers. At the conclusion of a conversion operation, A/D converter 108 produces an output at its CNT output which sets an external bi-stable latch 420. The bi-stable latch 420 applies a signal to the P3.5 input of microprocessor 400—thereby alerting the microprocessor that a value has been converted by the A/D converter 108 and is ready to be read into the microprocessor. Microprocessor 400 reads the internal A/D converter register(s) by applying a pulse to the RD input of A/D converter 108 and by reading the resulting parallel data generated by the converter via address/data bus 404. Bi-stable latch 420 is reset by application of a pulse to the RD input of A/D converter 108 to ready it for the next indication of a successful conversion by A/D converter 108.

A voltage reference providing circuit 422 including an op amp 424 and a resistor network 426 provides a voltage reference level to the VREF1/2 input of A/D converter 108 in the preferred embodiment. In the preferred embodiment, voltage reference providing network 422 is connected to +12 VDC—the same voltage level used to provide excitation voltage (via excitation signal generator 114) to load cells 102. By deriving the load cell excitation voltage and the A/D conversion reference voltage from the same power supply voltage, the effect of fluctuations or variations in power supply voltage on the measured loads is decreased.

The A15 output of microprocessor 400 provides a signal to the watchdog WDI input of power supply 116 as discussed previously. If microprocessor 400 for some reason began malfunctioning, it would no longer provide this watchdog output and power supply 116 would then automatically reset the microprocessor and thus cause it to begin executing its program control instructions from the beginning. The reset pulse provided by power supply 116 upon initial power-up (and upon triggering of the watchdog function) is applied to microprocessor 400 RST input via an NAND gate buffer 430. Microprocessor clock signals are provided via a conventional quartz crystal type external clock circuit 432.

In the preferred embodiment, speaker 54 is driven directly by a microprocessor P3.4 output via a series resistor 434 and a Darlington type driver circuit 436. Conventional alarm tone signalling algorithms are performed by microprocessor 400 to drive speaker 54 to produce various audible tones at various different pitches and repetition rates. Microprocessor 400 also produces eight outputs P1-P7 which are used to drive illuminating elements 52a-52d via buffer amplifiers 438. Each illuminating element 52a-52d has two microprocessor outputs associated with it: one for yellow and one for red.

The proximity channel filtering/thresholding circuits 112a,112b are applied respectively to microprocessor 400 interrupt input INT∅. As will be understood by those skilled in this art, microprocessor 400 executes an interrupt routine (to be explained in greater detail shortly) whenever it receives a pulse from proximity sensor 110a.110b via filtering/thresholding circuits 112a,112b. The microprocessor 400 provides multiplexer selection signals SLCT∅, SLT1 to analog MUX 106 so as to select between the outputs of load cell amplifier 104a, load cell amplifier 104b and power supply 116 reference voltage output—the selected analog MUX output being applied to A/D converter 108 as discussed previously.

The operation of system 100 will now be described in detail in connection with the flow charts of exemplary program control steps shown in FIGS. 11-14.

Figure 11:
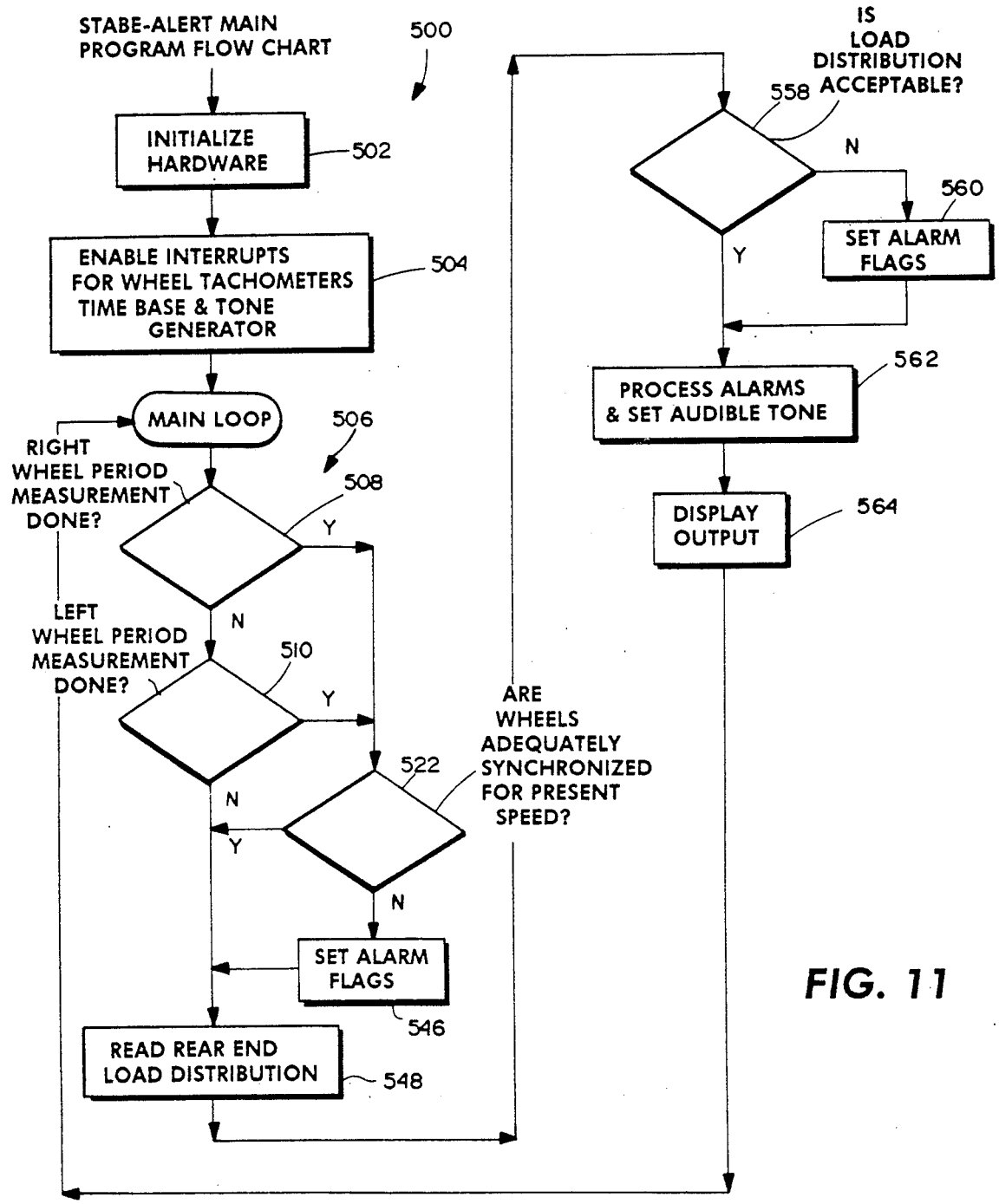
FIG. 11 is a flow chart of exemplary program control steps performed by the microcomputer shown in FIGS. 9A-9C.

FIG. 11 is a schematic flow diagram of exemplary program control steps performed by microprocessor 400 in the preferred embodiment as part of a "main" routine 500. Main routine 500 is performed beginning in response to a reset signal being applied to the RST input of microprocessor 400. The first step performed upon reset is to initialize the microprocessor and associated peripheral components in a conventional manner (block 502). Interrupt inputs are then enabled and hardware timers are started (block 504). Routine 500 then enters the "main loop" 506 which it continuously executes during operation of system 100.

As part of main loop 506, microprocessor 400 determines whether an interval measurement has recently been received attributable to either the right front wheel or the left front wheel (decision blocks 508,510). As mentioned previously, these time interval measurements are actually performed by an interrupt routine a detailed flow chart of which is shown in FIG. 11A. A version of interrupt routine 510 is performed each time filtering/thresholding circuit 112a applies a pulse to microprocessor 400 and each time filtering/thresholding circuit 112b provides a pulse to the microprocessor.

Referring briefly to FIG. 11A, upon receiving a pulse (indicative of the registration of target 160 of one of the front truck wheels with its associated proximity sensor 110), interrupt routine 510 first determines whether at least a minimum time period has elapsed since the last time a pulse corresponding to that particular wheel has been received (decision block 512).

In the preferred embodiment, a "windowing" technique is used to discriminate between front wheel pulses attributable to noise and front wheel pulses attributable to actual alignment of target 160 with proximity sensors 110. A moving motor vehicle provides an extremely hostile and noisy environment with many sources of noise (e.g., the engine, other vehicle electrical devices, etc.) potentially affecting the outputs produced by proximity sensors 110. At normal vehicle operating speeds (e.g., 0-60 mph), proximity sensor 110 should only produce a pulse relatively infrequently (e.g., on the order of 8 pulses per second corresponding to eight 360° rotations of the front tires at 60 mph, for example). In accordance with an aspect of the present invention, a minimum elapsed time interval is timed beginning upon receipt of a front wheel pulse—and any pulses received before this minimum elapsed time period has elapsed are assumed to be noise and are ignored.

FIG. 11B is a graphical illustration of windowing technique performed by the preferred embodiment of the present invention to discriminate between noise signals and "true" front wheel pulses. Assume a front wheel pulse FP is received at a time T∅. A timer is reset in response to the occurrence of this event (FIG. 11A, block 516) and microprocessor 400 waits for the next pulse to be received from that same front wheel (the interrupt driven nature of the FIG. 11A routine allows the microprocessor to perform other useful tasks while it is "waiting", as will be understood by those skilled in this art).

If a noise pulse FP1 (shown in phantom in FIG. 11B) is received before a minimum time period $T_{min}$ has elapsed (this minimum time period corresponds to, for example, the maximum practical or allowable speed of the truck during normal highway usage), the microprocessor 400 determines that the pulse cannot possibly be due to registration of target 160 with proximity sensor 110 (decision block 512, FIG. 11A)—since insufficient time has elapsed to have permitted the front wheel to rotate 360° at any practical highway speed. Accordingly, this new pulse is entirely ignored and is assumed to be noise, and interrupt between 510 returns no value (FIG. 11A, block 519).

If, on the other hand, a sufficient time has elapsed since the last "true" pulse FP was received before the next pulse FP2 is received by microprocessor 400 (the sensing "window" being "opened" beginning when the minimum time period $T_{min}$ has elapsed), interrupt routine 510 accepts this new pulse as an authentic pulse from the front wheel sensor 110, saves the current timer value (FIG. 11A, block 514), resets the timer in preparation for receiving the next pulse (FIG. 11A, block 516), and returns the timer value to main routine 500 (block 520, FIG. 11A).

Referring once again to FIG. 11, if interrupt routine 510 has returned a new measurement for either the right front wheel or the left front wheel (decision blocks 508,510), the main routine tests the returned value to determine whether the front wheels are adequately synchronized for the current speed (decision block 522). A flow chart of exemplary program control steps performed by decision block 522 is shown in FIG. 12.

Referring now to FIG. 12, microprocessor 400 first obtains the most recently acquired right front wheel pulse interval and the most recently acquired left front wheel pulse interval from internal memory/registers at blocks 524,526 respectively. Note that at least one of these two pulse intervals will have been acquired very recently (since synchronization routine 522 is performed in the preferred embodiment only upon recent completion of an interval measurement for a 360° rotation of either a right or a left front wheel). However, in the preferred embodiment, system 100 does not wait for both a new right front wheel pulse interval measurement and a new left front wheel interval measurement to be received before performing synchronization routine 522.

This is because in the preferred embodiment the positions of the front wheel mounted targets 160 with respect to one another are arbitrary. In other words, the timing of a pulse produced by left proximity sensor 110a will in general be arbitrary with respect to the timing of a pulse from the right front wheel proximity sensor 110b. In the preferred embodiment, the interval between successive left front wheel pulses is compared with the interval between successive right wheel pulses—but the relative timing between the beginnings and ends of these intervals is irrelevant.

Figure 12A:
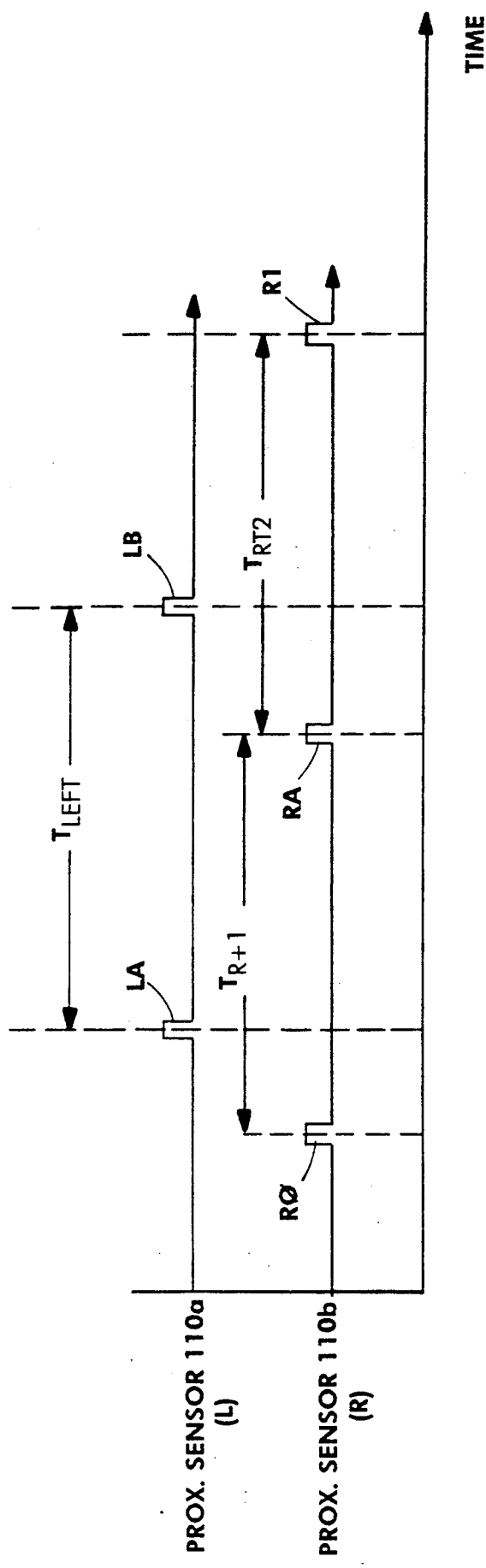
FIG. 12A is a graphical illustration of exemplary different measured time intervals compared by the FIG. 12 synchronization routine.

Referring to FIG. 12A, it can be seen that a recently acquired interval $T_{left}$ between successive left front wheel pulses LA and LB) may be validly compared with either of two time intervals $T_{rt1}$ and $T_{rt2}$. $T_{rt1}$ corresponds to the elapsed time between a pulse RA received after left wheel pulse LA and before the next successive left wheel pulse LB and an immediately previous right wheel pulse R∅; and interval $T_{rt2}$ corresponds to the time interval between right wheel pulse RA and the next successive wheel pulse $R_1$ (which occurs after left wheel pulse LB is received). In the preferred embodiment, both of these comparisons are made. That is, any arbitrary left wheel pulse interval $T_{left}$ is compared with both the $T_{rt1}$ and $T_{rt2}$ time intervals—and similarly, each right wheel pulse time interval is compared with two corresponding left wheel pulse intervals. Hence, twice as many comparisons can be performed using the same number of input pulses—thereby increasing the accuracy and sensitivity of sensor 100 and decreasing response time.

Referring back to FIG. 12, synchronization routine 522 tests each of the most recently measured right pulse interval and the most recently measured left pulse interval to ensure that they do not exceed a predetermined minimum pulse interval duration (512 milliseconds in the preferred embodiment) (decision block 528,530). It is common during low speed maneuvering for a truck to make very wide turns which system 100 could mistake for unsafe front wheel desynchronization. However, it is highly undesirable for a truck driver attempting to maneuver his truck into a loading dock area or through stop-and-start traffic to be distracted by false alarms from system 100. Therefore, in accordance with another aspect of the present invention, system 100 disables front wheel desynchronization alarm functions at low vehicle speeds. Decision blocks 528,530 ensure that measured pulse intervals do not exceed a minimum duration corresponding to a certain truck maneuvering speed (e.g., 15-20 mph). If both front wheels are spinning at a rate which indicates that the truck is going relatively slowly, speed is set to a default (block 532) and a pulse interval difference is forced to zero (block 534) in order to suppress alarm generation.

If, on the other hand, at least one of the left and right wheel pulse intervals indicate the truck is travelling at greater than the certain minimum speed, then decision block 536 determines whether at least three other intervals having similarly short durations have been successively measured. Thus, decision block 536 requires several successive interval measurements to be under the threshold required before entering "active wheel synchronization mode" in order to reject noise during low speed operation to prevent false alarm. Decision block 536 is an added measure to ensure that system 100 is not "fooled" by a noise pulse not filtered out by the windowing technique described in connection with FIG. 11B which falsely indicates the vehicle is travelling at a high speed when in fact it is still travelling at a low speed.

When synchronization routine 522 has satisfied itself that the truck is operating at a sufficiently high speed to make front wheel synchronization monitoring useful, it calculates the sum of the most recently measured right front wheel pulse interval and the most recently measured left front wheel interval to provide an average value indicative of current vehicle speed (FIG. 12, block 538). This average value (note that division by a factor of 2 would be possible but is unnecessary) is used to index into a lookup table (stored in EEPROM 406) of allowable pulse interval differences as a function of vehicle speed.

As mentioned previously, some amount of front wheel desynchronization occurs inherently every time the truck turns. However, in the preferred embodiment, system 100 does not derive an indication that a truck driver has negotiated a turn at an excessive speed from sensed front wheel desynchronization—and in fact, system 100 in the preferred embodiment has been designed to ensure that such an indication is never generated via sensing of desynchronization of the two front wheels. It would be highly undesirable for system 100 to generate an alarm every time a driver took a turn a few miles per hour faster than he "should", since this type of alarm would distract more than assist the driver and in any event does not necessarily indicate an unsafe condition (as will be explained shortly in connection with load imbalance sensing).

While it is desirable for the preferred embodiment system 100 to be sensitive to hazardous front wheel desynchronization, it is not desirable for the system to generate warnings in response to front wheel desynchronization due to the truck making a turn. The preferred embodiment synchronization routine 542, it will be understood, is sensitive only to "macro" effects. Hazardous loss of front wheel traction due to hydroplaning, icy road surfaces, or other conditions would typically result in a degree of front wheel desynchronization which is very much higher than the front wheel desynchronization due to traversing a curve. To make the system 100 more sensitive, however, the threshold front wheel desynchronization above which a warning is generated is dependent upon truck speed in accordance with one important aspect of the invention.

EEPROM 406 stores a lookup table of allowable interval difference values as a function of vehicle speed in the preferred embodiment. These values are obtained in the preferred embodiment by studying the dynamics of the particular truck or class of trucks being monitored—and then determining, for each of a plurality of truck speeds, a physical maximum theoretical front wheel desynchronization attributable to the truck maneuvering around a curve.

The magnitude of the centrifugal laterally outwardly directed G force (i.e., a force that makes a passenger slide across the seat) exerted upon the truck as it traverses a curved path is a function of the radius of the curved path and the truck velocity. As those skilled in this art well understand, centrifugal force is the tangential component of the inertia forces (vector) acting upon the truck, and represents the tendency of the truck to leave its curved path. As those skilled in the art well know, the dynamics of a specific truck determine how fast the truck can safely (or practically) turn through a given radius. If a truck takes a turn at too high a speed, the laterally outward G force acting on the truck may cause the truck to leave its curved path (and, for example, roll over on its side). The truck can safely make a wide turn at a lower speed, but can only make a more gentle turn at a higher speed. The limiting factor determining the radius of a curved path the truck can physically traverse at a given speed is the amount of laterally outward G force required to force the truck to leave the curved path.

In accordance with this one aspect of the present invention, this maximum theoretical allowable outward G force is used to determine the threshold for sensing a hazardous front wheel desynchronization. Test data specifying theoretical maximum outward G force at various vehicle speeds for particular types or classes of vehicles is available from a variety of sources, including the U.S. Department of Transportation. This data (or similar data obtained through experimentation and/or modelling) can be analyzed and used to determine the theoretical maximum allowable curve radii the truck can traverse for corresponding various speeds. The amount of front wheel desynchronization resulting from those curve radii can then readily be computed depending upon parameters relating to the particular class of truck (e.g., wheel size). Note that the resulting set of data points will specify higher threshold values for lower speeds (since wider turns can be taken at lower speeds) and lower threshold values for higher speeds (since only more gentle turns can be taken at the higher speeds). This results in system 100 being more "sensitive" to front wheel desynchronization when the truck is travelling at higher speeds—a significant advantage considering that the most serious accidents due to hydroplaning or other traction loss occur at higher speeds.

These computed front wheel desynchronization threshold values thus represent in the preferred embodiment, for various speeds, the maximum theoretical front wheel desynchronization that can possibly be attributable to the truck taking a turn. If the front wheels of a truck travelling at a certain speed are desynchronized more than the threshold value corresponding to that speed, the desynchronization must be caused by some phenomenon other than the truck going around a curve—since the radius of a curve required to produce front wheel desynchronization of that magnitude at that speed would result in a sufficiently high lateral G force to cause the truck to leave the roadway. It is typically desirable to provide a data set which is applicable to several different types of trucks so that a different EEPROM 406 need not be provided for each different type of truck system 100 is to be used in connection with (and thus, the actual values stored in the EEPROM may be the highest of values from different threshold data sets corresponding to various different types of trucks or other motor vehicles).

At any given speed, if front wheel desynchronization indicated by the difference calculated by block 542 is below the corresponding interval difference for that vehicle speed (speed is obtained by block 540 from the effective average of the left and right intervals, this average being indirectly proportional to current vehicle speed), synchronization routine 542 assumes that the front wheel desynchronization is due to the vehicle making a turn (or other non-hazardous condition) and does not generate an alarm. On the other hand, if the interval difference calculated by block 542 exceeds the allowable interval difference stored within the EEPROM 406 for the particular speed indicated by the block 538 calculation, a potentially hazardous front wheel desynchronization has occurred and system 100 generates an alarm (blocks 544, 546).

Referring once again to FIG. 11, main routine 500 next determines the rear end load distribution at block 548. FIG. 13 is a detailed flow chart of the steps performed by FIG. 11, block 548. Referring to FIG. 13, microprocessor 400 first controls analog MUX 106 to pass the output of left load cell amplifier 104a to A/D converter 108 for conversion; and then to pass the output of right load cell amplifier 104b to the converter for conversion—thereby reading both left and right load cell values via the A/D converter (block 550). Routine 548 then "filters" the left and right value (block 552) using an advanced pseudo-sliding window averaging method which filters read load data in order to smooth the data and eliminate sensitivity to noise sources. FIG. 14 is a detailed flow chart of an exemplary filtering step performed by block 552.

In the FIG. 14 filtering routine 552, a new average value is calculated as follows:

New Average =

Old Average − Old Average/256 + New Data/256

This filtering routine 552 is performed separately for each of the left and right measured load values to provide a new average corresponding to the left rear load cell and a new average corresponding to right rear load cell. These new average values thus include a factor corresponding to the most recently acquired load measurements, but also are largely dependent upon an "old" average value corresponding to recently acquired load measurements. The effect of filter routine 552 is to discount new measurement data which is very much different from recently acquired previous measurements—and thus to prevent system 100 from responding rapidly to large changes in load cell measurements. While filter routine 552 increases response time, this increased response time does not adversely affect (and, in fact, actually improves) the performance of system 100 because in the preferred embodiment main loop 506 shown in FIG. 11 (and thus the "read" rear end load distribution block 548) is performed many hundreds of times each second by microprocessor 400.

Referring once again to FIG. 13, the filter "new average" values provided by filter routine 552 for left and right rear loads are used to calculate a weight ratio at block 554. This weight ratio is saved (block 556) and control is returned to main routine 500 where it is determined whether the calculated weight ratio is acceptable (block 558, FIG. 11).

No trailer 66 carrying a load ever has a perfectly balanced load. Various factors (e.g., the nature of the load and the way it is tied down, the dynamics of the trailer system, the tires and other truck suspension elements, and even the roadway surface itself) can affect the distribution of force exerted by the load on the left rear and right rear load cells 102. A load imbalance of perhaps 65%:35% or 60%:40% is considered to be normal by decision block 558. On the other hand, a load imbalance of 75%:25% or more is considered by decision block 558 to be moderately abnormal and block 560 illuminates illuminating element 52c,52d with yellow when this condition is detected. If decision block 558 detects from the calculated weight ratio a load imbalance of about 85%:15% or higher, it sets illuminating elements 52c,52d to generate red to indicate the existence of an extremely hazardous condition (e.g., possibly capable of causing the truck to turn over).

If the truck driver goes through a turn at a high speed, the result will be a momentary change in the distribution of the load on the rear truck frame (e.g., the portion of the frame on the "outside" of the turn temporarily "sees" more of the load due to centrifugal force while the portion of the frame on the inside of the turn temporarily sees less force). Load shifting due to excessive speed through a curve can generate a hazard (e.g., a load with a high center of gravity can sometimes cause the truck to turn over or the trailer to slide if the truck is driven though a turn at an excessive speed). In the preferred embodiment, decision block 558 generates an alarm if load shifting due to excessive vehicle speed through a turn is sensed. Thus, even though the preferred embodiment in system 100 ignores wheel desynchronization due to turns (as explained previously), it is nevertheless highly sensitive to shifting in load force distribution due to the same effect. System 100 thus provides an indication of excessive speed through curves which is more useful than that provided by simply measuring the degree of front wheel synchronization through turns—since the maximum safe speed through a turn is in fact dependent truck loading. Hence, the warning indication provided by display 50 is a true "stability" warning indication providing an immediate and useful warning whenever a potentially hazardous instability condition exists.

Main routine 500 concludes by processing alarms at block 562 and displaying outputs at block 564. Alarms are maintained "on" in the preferred embodiment until the sensed condition which generated them has been alleviated (e.g., by corrective or remedial action taken by the driver). However, in the preferred embodiment an alarm which has exceeded a certain time duration is discontinued in order to avoid disturbing the driver with false alarms caused by equipment or sensor malfunction.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for monitoring the stability of a motor vehicle of the type including left and right front wheels each for retaining a tire and left and right rear wheels each for retaining a tire; said tires each for matching in contact with a road surface and each supporting part of a load, said apparatus comprising:
   load sensing means, operatively coupled to said vehicle, for sensing a first parameter related to force exerted by said load on said left rear wheel and for sensing a further parameter related to force exerted by said load on said right rear wheel;
   means coupled to said load sensing means for comparing said sensed first and second parameters and for generating a first signal if said sensed first and second parameters are substantially different from one another;
   front wheel synchronization sensing means, operatively coupled to said left and right front wheels, for sensing the rotational velocity of said left front wheel, for sensing the rotational velocity of said right front wheel, and for generating a second signal if said sensed right front wheel rotational velocity is substantially different from said sensed left front wheel rotational velocity; and
   alarm means connected to receive said first and second signals for providing an audible and/or visual warning in response to any of said first and second signals.

2. A method for providing a warning of a potentially unsafe condition existing within a motor vehicle moving at a speed, said vehicle of the type including left and right front wheels each rotating at an angular velocity in contact with a road surface, said left and right front wheels supporting said motor vehicle on said road surface, said method including the following steps:
   (a) measuring a first time interval relating to the angular velocity of said left front wheel;
   (b) measuring a second time interval relating to the angular velocity of said right front wheel;
   (c) determining the difference between said first and second time intervals; and
   (d) generating an alarm if said determined difference exceeds a threshold level.

3. A method as in claim 2 wherein:
   said method further includes generating a signal indicating a threshold level responsive to the speed of said vehicle; and
   said generating step (d) includes the step of comparing said determined difference with said generated threshold level.

4. A method as in claim 3 wherein said threshold level generating step includes averaging said first and second measured time intervals.

5. A method as in claim 3 wherein said method further includes determining a maximum practical lateral G force responsive to vehicle speed that said vehicle is capable of sustaining, and said threshold level generating step includes providing a threshold level responsive to (i) the speed of said vehicle, and (ii) said maximum practical lateral G force sustainable by said vehicle at said vehicle speed.

6. A method as in claim 2 wherein said method further includes the following steps:
   (i) deriving a speed parameter indicating the speed of said vehicle from at least one of said first and second time intervals, and
   (ii) generating said threshold level in response to said speed parameter.

7. A method as in claim 2 wherein:
   said method further includes the steps of storing beforehand a plurality of threshold values corresponding to an associated plurality of speeds of said vehicle; and
   said generating step (d) includes the step of selecting one of said stored threshold values in response to at least one of said measured first and second time intervals.

8. A method as in claim 7 wherein said selecting step includes the following steps:
   (i) generating a speed parameter indicative of the speed of said vehicle in response to both said first and said second time intervals; and
   (ii) selecting one of said stored thresholds in response to said generated speed parameter.

9. A method as in claim 8 wherein said generating step (i) includes the step of averaging said first and second time intervals.

10. A method as in claim 2 wherein:
    said measuring step (a) comprises the step of timing the interval over which said left front wheel rotates one revolution; and
    said measuring step (b) comprises the step of timing the interval over which said right front wheel rotates one revolution.

11. A method for providing a indication of loss of front wheel traction of a moving large motor vehicle of the type including left and right front wheels each rotating at an angular velocity, said left and right front wheels rotating in contact with a road surface and supporting said vehicle, said method including the following steps:
    (a) measuring the angular velocity of said left front wheel;

(b) measuring the angular velocity of said right front wheel;
(c) measuring the speed of said vehicle;
(d) generating a threshold level related to a maximum theoretical difference between said vehicle left and right front wheel angular velocities attributable to said vehicle transversing a curved path at said vehicle speed in response to said measured vehicle speed;
(e) determining the difference between said left and right front wheel measured angular velocities; and
(f) generating an output signal if said determined difference exceeds said generated threshold level.

12. A method for providing an indication of the stability of a moving motor vehicle of the type including first and second front wheels which rotate nominally in synchronization with one another and further including first and second rear wheels supporting a load, said front and rear wheels having tires mounted thereon for rotating in contact with a road surface, said front and rear wheels supporting said motor vehicle on said road surface said method comprising the following steps:
   (a) monitoring desynchronization between said first and second front wheels;
   (b) monitoring the distribution of forces exerted by said load on said first and second rear wheels;
   (c) monitoring the speed said vehicle;
   (d) generating an alarm if said monitored desynchronization of said first and second front wheels exceeds a threshold level responsive to said monitored speed, including the step of testing, in response to an amount of desynchronization between said front wheels, if said monitored desynchronization is caused by said motor vehicle transversing a curved path and inhibiting said alarm generation if said testing step reveals said vehicle is transversing said curved path; and
   (e) generating an alarm in response to said monitored forces distribution if said force exerted by said load on one of said first and second rear wheels is substantially different from the force exerted by said load on the other of said first and second rear wheels.

13. A method for monitoring the stability of a motor vehicle of the type including left and right front wheels each having a rotational velocity and left and right rear wheels supporting a motor vehicle as said vehicle moves along a road surface, said vehicle carrying a load, said method comprising:
   (a) sensing a first parameter related to force exerted by said load on said left rear wheel;
   (b) sensing a further parameter related to force exerted by said load on said right rear wheel;
   (c) comparing said sensed first and second parameters and generating a first signal if said sensed first and second parameters are substantially different from one another;
   (d) sensing the rotational velocity of said left front wheel;
   (e) sensing the rotational velocity of said right front wheel;
   (f) generating a second signal if said sensed right front wheel rotational velocity is substantially different from said sensed left front wheel rotational velocity; and
   (g) providing an audible and/or visual warning in response to said first and second signals.

14. Apparatus for providing a warning of a potentially unsafe condition existing within a motor vehicle of the type including left and right front wheels each rotating at an angular velocity and supporting said motor vehicle as it moves along a road surface, said apparatus including:
   first timing means operative coupled to said left front wheel for measuring a first time interval relating to the angular velocity of said left front wheel;
   second timing means operatively coupled to said right front wheel for measuring a second time interval relating to the angular velocity of said right front wheel;
   means connected to aid first and second timing means for determining the difference between said first and second time intervals; and
   means connected to said determining means for generating an alarm if said determined difference exceeds a threshold level.

15. Apparatus as in claim 14 wherein:
   said apparatus further includes means for generating a threshold level signal responsive to the speed of said vehicle; and
   said generating means includes means for comparing said determined difference with said generated threshold level signal.

16. A apparatus as in claim 14 wherein said threshold level generating means includes means for averaging said first and second measured time intervals.

17. Apparatus as in claim 16 wherein said threshold level generating means includes means for providing a threshold level responsive to (i) the current speed of said vehicle, and (ii) the maximum practical lateral G force sustainable by said vehicle at said current speed.

18. Apparatus as in claim 14 wherein said apparatus further includes:
   means for deriving a speed parameter indicating the speed of said vehicle from at least one of said first and second time intervals, and
   means for generating said threshold level in response to said speed parameter.

19. Apparatus as in claim 14 wherein:
   said apparatus further includes memory means for storing a plurality of threshold values corresponding to an associated plurality of speeds of said vehicle; and
   said generating means includes means for selecting of one of said stored threshold values in response to at least one of said measured first and second time intervals.

20. Apparatus as in claim 19 wherein said selecting means includes:
   means for generating a speed parameter indicative of the speed of said vehicle in response to both said first and said second time intervals; and
   means for selecting one of said stored thresholds in response to said generated speed parameter.

21. Apparatus as in claim 14 wherein said generating means includes means for averaging said first and second time intervals.

22. Apparatus as in claim 14 wherein:
   said first measuring means comprises means for timing the interval over which said left front wheel rotates one revolution; and
   said second measuring means comprises means for timing the interval over which said right front wheel rotates one revolution.

23. Apparatus for providing a indication of loss of front wheel traction of a moving large motor vehicle of the type including left and right front wheels for supporting said motor vehicle as it moves along a road surface, said wheels having tires contacting said road surface mounted thereon, said apparatus comprising:
- first measuring means operatively coupled to said left front wheel for measuring the angular velocity of said left front wheel;
- second measuring means operatively coupled to said right front wheel for measuring the angular velocity of said right front wheel;
- speed measuring means operatively coupled to said vehicle for measuring a parameter related to the speed of said vehicle;
- means connected to receive said measured vehicle speed parameter for generating a threshold level related to a maximum theoretical difference between said vehicle left and right front wheel angular velocities attributable to said vehicle transversing a curved path at said vehicle speed in response to said measured vehicle speed parameter;
- means connected to said first and second measuring means for determining the difference between said left and right front wheel measured angular velocities; and
- means connected to said determining means and to said threshold generating means for generating an output signal if said determined difference exceeds said generated threshold level.

24. Apparatus for providing an indication of the stability of a moving motor vehicle of the type including first and second front wheels and further including first and second rear wheels rotatably supporting a motor vehicle carrying a load as said; motor vehicle moves along a road surface, said wheels each having a tire mounted thereon, said tires rotatably contacting said road surface, said apparatus comprising:
- desynchronization monitoring means operatively coupled to said first and second front wheels for monitoring an amount of desynchronization between said first and second front wheels;
- force distribution monitoring means operatively coupled to the rear of said vehicle for monitoring the distribution of forces exerted by said load on said first and second rear wheels;
- means coupled to said vehicle for monitoring the speed said vehicle;
- first alarm generating means connected to said desynchronization monitoring means and to said speed monitoring means for generating an alarm if said monitored desynchronization of said first and second front wheels exceeds a threshold level signal responsive to said monitored speed, including means responsive to said monitored amount of desynchronization for testing if said monitored amount of desynchronization is caused by said motor vehicle traversing a curved path and for inhibiting said alarm generation of said testing reveals said desynchronization is caused by said vehicle traversing said curved path; and
- second alarm generating means connected to said force distribution monitoring means for generating an alarm in response to said monitored forces distribution if said force exerted by said load on one of said first and second rear wheels is substantially different from the force exerted by said load on the other of said first and second rear wheels.

25. Apparatus for providing an indication of the stability of a moving motor vehicle of the type including first and second front wheels and further including first and second rear wheels supporting said motor vehicle as said vehicle moves along a road surface, said wheels having tires mounted thereon, said tires rotating in contact with said road surface, said motor vehicle carrying a load, said apparatus comprising:
- desynchronization monitoring means operatively coupled to said first and second front wheels for monitoring the degree of desynchronization between said first and second front wheels, said desynchronization monitoring means including:
  - sensing means operatively connected to said first front wheel for generating a first pulse train at a rate responsive to the rotation rate of said first front wheel, and
  - interrupt processing means, connected to receive said first pulse train, for timing the intervals between successive pulses in said first pulse train, including means for ignoring pulses in said first train which occur less than a preset time period after immediately preceding pulses in said pulse train;
- means coupled to said vehicle for monitoring the speed said vehicle; and
- alarm generating means connected to said desynchronization monitoring means and to said speed monitoring means for generating an alarm if said monitored degree of desynchronization of said first and second front wheels exceeds a threshold level responsive to said monitored speed.

26. Apparatus for providing an indication of the stability of a moving motor vehicle of the type including first and second front wheels having tires mounted thereon and further including first and second rear wheels also having tires mounted thereon, said tires supporting a load, said apparatus comprising:
- desynchronization monitoring means operatively coupled to said first and second front wheels for monitoring the degree of desynchronization between said first and second front wheels, said desynchronization monitoring means including:
  - sensing means operatively connected to said first front wheel for generating a first pulse train at a rate responsive to the rotation rate of said first front wheel, and
  - interrupt processing means, connected to receive said first pulse train, for timing the intervals between successive pulses in said first pulse train, including means for determining whether more than one successively timed interval are less than a predetermined minimum time interval and for generating an enabling signal in response to said determination; and
- alarm generating means connected to said desynchronization monitoring means and to said interrupt processing means monitoring means for generating an alarm if said monitored degree of desynchronization of said first and second front wheels exceeds a threshold level and said enabling signal is present.

27. Apparatus for providing an indication of the stability of a moving motor vehicle of the type including first and second front wheels having tires mounted thereon and further including first and second rear wheels also having tires thereon and supporting a load, said apparatus comprising:

force distribution monitoring means operatively coupled to the rear of said vehicle for monitoring the force exerted by said load on said first rear wheel;

rolling averaging means connected to receive said monitored force for generating a rolling average value of said monitored force, said rolling average value responsive to an average previously generated by said averaging means and also responsive to said monitored force; and alarm generating means connected to said rolling averaging means for generating an alarm if said average value distribution at least in part indicates said force exerted by said load on one of said first and second rear wheels is substantially different from the force exerted by said load on the other of said first and second rear wheels.

28. Apparatus as in claim 27 wherein said rolling averaging means includes means for computing said average value in accordance with the following relation:

Average Value =

Previous Average − Previous Average/$X$ + Monitored Force/$X$ where X is an integer.

29. Apparatus for providing an indication of the stability of a moving motor vehicle of the type including first and second front wheels having tires mounted thereon and further including first and second rear wheels also having tires thereon and supporting a load, said apparatus comprising:

desynchronization monitoring means operatively coupled to said first and second front wheels for monitoring the degree of desynchronization between said first and second front wheels;

force distribution monitoring means operatively coupled to the rear of said vehicle for monitoring the distribution of forces exerted by said load on said first and second rear wheels; and alarm generating means connected to said desynchronization monitoring means and to said force distribution monitoring means for:

generating an alarm if said monitored degree of desynchronization of said first and second front wheels exceeds a threshold level, generating an alarm in response to said monitored forces distribution if said force exerted by said load on one of said first and second rear wheels is substantially different from the force exerted by said load on the other of said first and second rear wheels, and silencing any alarm generated for more than a predetermined time period.

30. An arrangement for monitoring the rate of rotation of a rotating wheel of a moving motor vehicle, comprising:

ferromagnetic target means disposed on said wheel;

inductive proximity sensing means for producing an output whenever said target moves into proximity therewith; and mounting bracket means disposed on said motor vehicle for retaining said sensing means in a substantially fixed position relative to said wheel, said mounting bracket means comprising:

base mounting plate means for coupling to said vehicle, said base mounting plate means including means for defining a central hole therethrough so as to permit a kingpin grease fitting to extend through said plate means, said base mounting plate means further including a mounting tab having a hole therethrough;

elongated bracket means for coupling to said base mounting plate means, said bracket means including means for defining an elongated slot therein;

fastening means passing through said tab hole and through said elongated slot for connecting said bracket means to said tab and for permitting the position of said bracket means to be adjusted relative to the position of said base mounting plate means; and sensor mounting bracket means fastened to said elongated bracket means for retaining said sensing means in close proximity to said wheel.

31. A method for providing a warning of potentially unsafe and hazardous loss of traction and/or other conditions existing with respect to wheels of a motor vehicle, said motor vehicle of the type that moves along a road surface at a speed and includes first and second tires rotatably mounted on a common axle, said first and second tires supporting said motor vehicle as said vehicle moves along said road surface, said first tire and said second tire each for rotating in contact with said road surface at rates nominally proportional to the speed of said vehicle, said method including the following steps:

(a) producing a first electrical signal responsive to the rate at which said first tire rotates;

(b) producing a further electrical signal responsive to the rate at which said second tire rotates;

(c) determining, in response to said first and further electrical signals, the difference between the rate at which said first time rotates and the rate at which said second tire rotates;

(d) measuring the speed said motor vehicle is moving;

(e) generating a threshold signal having a level responsive to said measured motor vehicle speed; and (f) providing an alarm if said determined difference exceeds said threshold level, said alarm indicating that at least one of said first and second tires is slipping with respect to said road surface.

32. A method as in claim 31 wherein said method further includes the steps of:

inhibiting said alarm providing step (f) if said measured speed is less than a predetermined low speed; and adjusting the amplitude of said threshold level in response to measured vehicle speed whenever said measured speed exceeds said predetermined low speed.

33. A method as in claim 31 wherein said generating step (e) includes the step of varying said threshold signal level in response to measured motor vehicle speed so as to make it indirectly proportional to said measured motor vehicle speed.

34. A method as in claim 31 wherein said motor vehicle includes a front axle and said first and second tires are each mounted on said front axle.

35. A method for providing a warning of potentially unsafe and hazardous loss of tire traction existing with respect to a motor vehicle, said motor vehicle of the type that moves along a road surface at a speed and including first and second tires rotatably mounted thereon, said first and second tires supporting said motor vehicle as said vehicle moves along said road surface, said first tire and said second tire each for rotating in contact with said road surface at rates nominally proportional to the speed of said vehicle, said method including the following steps:

(a) producing a first electrical signal responsive to the rate at which said first tire rotates;

(b) producing a further electrical signal responsive to the rate at which said second tire rotates;

(c) generating, in response to said first and further electrical signals, a difference signal proportional to the difference between the rate at which said first tire rotates and the rate at which said second tire rotates;

(d) measuring the speed said motor vehicle is moving;

(e) generating a threshold signal having a level responsive to a maximum curvature radius said motor vehicle is capable of turning through at said measured motor vehicle speed; and (f) generating an alarm if said determined difference exceeds said threshold level, said alarm indicating that at least one of said first and second tires is slipping with respect to said road surface.

36. A method as in claim 35 wherein said generating step (e) includes the setting said threshold level in response to a maximum theoretical allowable outward G force required to cause said motor vehicle, travelling at said measured speed through a curved path, to leave said curved path.

37. A method as in claim 35 wherein said measuring step (d) includes determining motor vehicle speed at least partially in response to at least one of said first and further electrical signals.

* * * * *